(12) United States Patent
Palatov

(10) Patent No.: US 12,046,722 B2
(45) Date of Patent: **\*Jul. 23, 2024**

(54) STATIONARY INSTALLATIONS WITH AN ELECTRICAL POWER SYSTEM

(71) Applicant: Dennis Palatov, Portland, OR (US)

(72) Inventor: Dennis Palatov, Portland, OR (US)

(73) Assignee: Palatov Group, LLC, Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/086,515

(22) Filed: Dec. 21, 2022

(65) Prior Publication Data
US 2023/0122755 A1    Apr. 20, 2023

Related U.S. Application Data

(63) Continuation of application No. 17/528,903, filed on Nov. 17, 2021, which is a continuation-in-part of application No. 17/172,613, filed on Feb. 10, 2021, now Pat. No. 11,563,241.

(51) Int. Cl.
| | |
|---|---|
| *H01M 10/42* | (2006.01) |
| *B60R 16/023* | (2006.01) |
| *H01M 10/48* | (2006.01) |
| *H04L 9/40* | (2022.01) |

(Continued)

(52) U.S. Cl.
CPC ....... *H01M 10/425* (2013.01); *B60R 16/0231* (2013.01); *H01M 10/482* (2013.01); *H04L 63/0876* (2013.01); *H04W 12/06* (2013.01); *H01M 2010/4271* (2013.01);

(Continued)

(58) Field of Classification Search
CPC ............ H01M 10/425; H01M 10/482; H01M 10/4285; H01M 10/4207; H01M 10/46; H01M 2010/4271; H01M 2010/4278; B60R 16/0231; H04L 63/0876; H04L 63/0428; H04W 12/06; H04W 12/03
See application file for complete search history.

(56) References Cited

U.S. PATENT DOCUMENTS

| | | |
|---|---|---|
| 8,575,894 B2 | 11/2013 | White et al. |
| 9,184,476 B2 | 11/2015 | Suzuki |
| 9,315,113 B2 | 4/2016 | Shrinkle |

(Continued)

OTHER PUBLICATIONS

Sandia National Laboratories Report SAND2017-10722 Heeger et al. "Lithium Battery Health and Capacity Estimation Techniques Using Embedded Electronics".

*Primary Examiner* — Raymond Alejandro
(74) *Attorney, Agent, or Firm* — Mohr Intellectual Property Law Solutions, PC

(57) ABSTRACT

A power system for a stationary installation comprising a battery pack, a system component, and a system control unit. The batter pack has a plurality of removable battery modules. Each battery module has an internally controllable connection to a common power bus. The system component is controlled by a power controller unit having a connection to the common power bus. The system control unit is in communication with each of the battery modules and the power controller unit. The system control unit receives control inputs from an operator of the power system. The operator may be a human operator, an electronic operator unit, or a combination thereof.

10 Claims, 12 Drawing Sheets

(51) Int. Cl.
*H04W 12/06* (2021.01)
*H04W 12/03* (2021.01)

(52) U.S. Cl.
CPC ............ *H01M 2010/4278* (2013.01); *H04L 63/0428* (2013.01); *H04W 12/03* (2021.01)

(56) References Cited

U.S. PATENT DOCUMENTS

| | | | |
|---|---|---|---|
| 9,694,707 | B2 | 7/2017 | Shrinkle |
| 10,011,162 | B2 | 7/2018 | Yoon et al. |
| 10,333,328 | B1 * | 6/2019 | Hom ................... H02J 7/0013 |
| 2005/0024015 | A1 | 2/2005 | Houldsworth et al. |
| 2008/0183914 | A1 | 7/2008 | Gorbold et al. |
| 2009/0130541 | A1 | 5/2009 | Emori et al. |
| 2013/0271072 | A1 | 10/2013 | Lee et al. |
| 2017/0179543 | A1 | 6/2017 | Camp et al. |
| 2022/0029431 | A1 * | 1/2022 | McLean ................ B60L 50/66 |
| 2022/0166225 | A1 * | 5/2022 | Robinson ............... G06F 1/266 |

* cited by examiner

STATIONARY INSTALLATIONS WITH AN ELECTRICAL POWER SYSTEM

PRIORITY CLAIM

This application is a Continuation of the co-pending application ELECTRICAL POWER SYSTEM WITH REMOVABLE BATTERY MODULES, Ser. No. 17/528,903, filed on Nov. 17, 2021, which is a Continuation In Part of application APPARATUS AND METHODS FOR REMOVABLE BATTERY MODULE WITH INTERNAL RELAY AND INTERNAL CONTROLLER, Ser. No. 17/172,613, filed on Feb. 10, 2021, issued as U.S. Pat. No. 11,563,241B2 on Jan. 24, 2023, which both are incorporated herein by reference in their entirety. Additionally, this application is related to the application BATTERY MODULE WITH SERIES CONNECTED CELLS, INTERNAL RELAYS AND INTERNAL BATTERY MANAGEMENT SYSTEM, Ser. No. 17/182,072, issued as U.S. Pat. No. 11,575,270B2 on Feb. 7, 2023, which is incorporated herein by reference in its entirety.

BACKGROUND OF THE INVENTION

A vehicle battery module typically has significant monetary value associated with it, often ranging in the hundreds or thousands of dollars.

Battery modules commonly known in the art are constructed to be permanently installed in a sealed battery pack that is not easily accessed or serviced. Due to this fact, there is no need seen to additionally secure, track, or deter theft of such modules. The difficulty of physically accessing and removing the modules known in the art is commonly considered sufficient deterrent to theft.

In the referenced co-pending application, the applicant discloses novel apparatus and methods for battery packs comprising a plurality of removable high voltage modules that are individually enabled and disabled.

Due to the ease of module removal and the ability to use same module in different packs which is inherent in the novel removable high voltage modules taught by the applicant, the need arises to track, control the use of, and deter theft of the modules.

Additionally, with battery packs configured to accept new or replacement removable modules, it is desirable to ensure that any newly installed modules are compatible with the specific pack and the apparatus powered by the pack, and are safe to enable for operation.

What is needed in the arts of vehicle batteries is a removable battery module design, and methods of operation of same, that facilitate control over the use of the modules, deter unauthorized or incompatible use, and facilitate both tracking of the modules in ordinary use and assist the recovery of any modules that are stolen.

SUMMARY OF THE INVENTION

A first objective of the present invention is to provide a removable high voltage battery module having a means to check whether an attempted use of the module is authorized, and to deter unauthorized use.

A second objective of the present invention is to provide a battery module design, battery pack design, infrastructure design and methods that facilitate tracking of the ordinary use of the module.

A third objective of the present invention is to provide a battery module design, battery pack design, infrastructure design and methods that assist the location and recovery of a module that has been stolen.

To achieve the objectives, a battery module of the present invention is assigned at least a unique identifier (ID) at the time of manufacture. In embodiments wherein modules have serviceable components, a first unique ID may be associated with non-serviceable components, and one or more serviceable components may be assigned additional unique IDs.

The module controller of the present invention contained within the module is provided with the means of secure communication with a pack controller.

A pack controller of the present invention is likewise assigned a unique ID at the time of manufacture, and is likewise provided with the means of secure communication with a module controller contained within one or more removable modules.

A pack controller is further provided with a means of securely communicating with an authentication controller.

Distinct programmed states of a removable battery module are disclosed, each of said states having a distinct set of module functions that are enabled, and may further have a distinct set of module functions that are disabled. In some states, certain module functions may be limited or restricted. In some states, unauthorized use of module is deterred.

Methods are provided for transitioning a module between distinct programmed states. Some of the transitions may be effected responsive to secure communications with an authentication controller.

Additional methods are provided for communicating module data from pack controller to data center, checking whether the specific module has been reported as stolen, reporting a module as stolen, and reporting a module as recovered.

BRIEF DESCRIPTION OF THE DRAWINGS

The present invention is described herein with reference to the following drawings. The components in the drawings are not necessarily to scale relative to each other. Like reference numerals designate corresponding parts throughout the several views.

DETAILED DESCRIPTION

Figure 1:
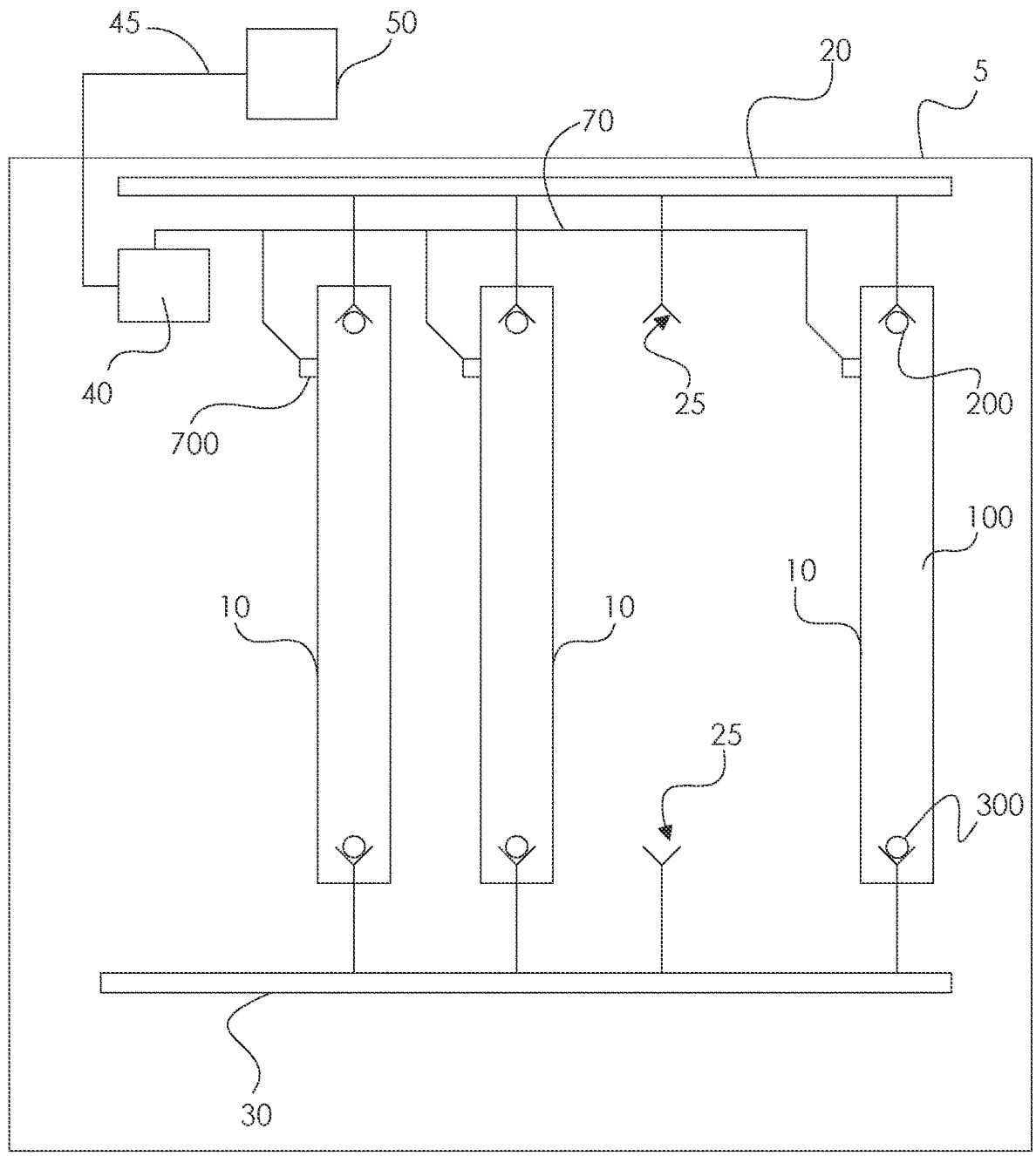
FIG. 1 is a diagram representation of a modular battery pack of the present invention communicatively coupled to an authentication controller.

An embodiment of a modular battery pack 5 of the present invention having a plurality of removable battery modules 10, and being communicatively coupled to authentication controller 50, is diagrammatically illustrated in FIG. 1. The illustrated embodiment is not limiting. Other embodiments shall become apparent to those skilled in the art based on the disclosures made herein.

The disclosed systems and methods for operating modular battery packs 5 having removable battery modules 10 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, a variety of examples for systems and methods for the battery pack 5 and battery modules 10 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

"Electrically coupled", "electrically connected" means circuit elements connected in a way to enable conduction of electrical current between the elements.

"Connector", "electrical connector" means a structure or device to electrically couple circuit elements in a way that is releasable.

"Interconnect", "electrical interconnect" means a structure or device to electrically couple circuit elements in a way that is not releasable.

"Communicatively coupled" means that an electronic device is in communication with another electronic device for the purpose of transmission of electronic messages, either wirelessly or with a connector, whether directly or indirectly through a communication network.

"Controllably coupled" means that an electronic device controls operation of another electronic device.

"PCBA" means a printed circuit board assembly, comprising a non-conductive substrate, one or more etched electrically conductive traces for electrically coupling circuit elements, and one or more electrical circuit elements which may be integrated circuits, relays, cell interconnects and the like.

"Cell", "battery cell" refers to a single anode and cathode separated by electrolyte used to produce a voltage and current. A battery module of the present invention comprises one or more groups of cells connected in series within the group. Cells may be cylindrical, prismatic, pouch, or any other type. Cells may be of Lithium-Ion or any other chemical type.

"Command message", "command" is an electronic message sent from a first electronic circuit to a second electronic circuit to initiate an action or state change by said second circuit. In many embodiments, a command message will be a secure message transmitted by means of secure communication.

"Status message" is an electronic message sent by a second electronic circuit to a first electronic circuit, said message containing information pertaining to state or action status of said second circuit, or another circuit.

"Secure communication", "secure message" means communication by means of an encrypted message, or any other type of message that deters reading, modification or falsification by unauthorized parties or devices. Any type of known encryption may be utilized, including public key, private key, digital signing and the like. Different types of secure communication may be utilized within an embodiment for different types of messages. Encryption and decryption of messages may be carried out in software and may be carried out with hardware assist in controllers so equipped. Secure communication is well known in the arts of electronic devices and is therefore not described in detail herein.

"Unique ID" means a numeric or alphanumeric value that is generated to be unique and assigned to a specific physical device such as an electronic circuit, electronic assembly, or a machine which may be a vehicle. Generation and assignment of unique IDs is well known in the arts. Registration of unique IDs in a database is also well known. For vehicles, the unique ID typically takes the form of a Vehicle Identification Number (VIN). Various types of electronic circuits are known which have unique ID assigned and imbedded in them at the time of manufacture, such as controllers, processing units, networking controllers and the like. Assigning a unique ID to an electronic device is well known in the arts of electronic device design and is therefore not described in detail herein.

"Vehicle Identification Number", "VIN" means a unique ID that is officially assigned and registered to a vehicle by the vehicle manufacturer. A VIN is customarily recorded in a database by a Government agency.

"Product Identification Number", "PIN" means a unique ID that is assigned to apparatus comprising a battery pack by the manufacturer of the apparatus, when such apparatus is not a vehicle. Examples of apparatus having a PIN are battery chargers, in-home and commercial energy storage units, backup power supplies and the like. A PIN may be recorded in a database by the apparatus manufacturer, industry agency, or Government agency.

"Module Identification Number", "MIN" means a unique ID that is assigned to a battery module by the module manufacturer. A MIN may be recorded in a database by the module manufacturer, industry agency, or Government agency.

"System Control Unit", "SCU" means an electronic controller which is controllably coupled to and controls the operation of vehicle electronic and electromechanical systems responsive to operator inputs.

"Authentication controller" means an electronic device having a means to authenticate whether an attempted use of a battery pack or a battery module is authorized. For an electronic device that is a SCU, such means may include being communicatively coupled to a vehicle key. For a controller connected to the Internet or another network, such means may include being communicatively coupled to a data center having a database of registered PINs or MINs. Other authentication means may include sensing operator biometrics, entry of a passcode by the operator, or any other known authentication means.

"Battery module", "module" means an electronic device comprising a plurality of cells connected in series, a positive and a negative terminal, relays to electrically couple the plurality of cells to each of the positive and negative terminals, and means of controllably coupling the relays to a controller. In some embodiments the means of controllably coupling the relays to a controller is a Battery Management System (BMS) controller capable of secure communication.

"Battery pack", "pack" means electrical, mechanical and electronic apparatus configured to releasably receive a plurality of battery modules, electrically couple the received modules in parallel among like modules, electrically couple the modules collectively to an external electrical load or electrical source, and controllably couple the modules collectively to a controller. A battery pack may be configured to only charge the received modules, only discharge the received modules, or both.

"Battery module state", "module state", "state" means a distinct programmed configuration of a battery module in which some specific functionality of the module may be enabled, some specific functionality of the module may be disabled, and some specific functionality of the module may be limited or restricted. For example, charging and discharging current limits may be set to different specific values in different states, and may be set to zero in some states. In the context of the present invention and the descriptions presented herein, a module state is implemented by means of execution of a control program in the module controller to control one or more relays responsive to one or more controlling parameters which are stored in nonvolatile memory, and further responsive to monitored operating conditions such as current, voltage and temperature measurements. Monitoring of operating conditions is accomplished by means of measurement circuits and is well known in the arts of electronic circuit design. Storing parameters in nonvolatile memory is known in the art of controllers and is not described in detail herein. Transitions between states are accomplished programmatically responsive to command messages received by module controller, and may further be responsive to monitored operating conditions. Some state transitions may be conditional on successful authentication.

"Passive state" means a battery module state in which all relays are disabled, and which requires the reception of a valid command message from an authorized pack controller in order to transition to an active state. Transition from a first passive state to another passive state may be responsive to monitored operating conditions or responsive to a command and may require authentication.

"Active state" means a battery module state in which one or more relays are under active control of the module controller responsive to monitored operating conditions such as measured current, measured voltage, measured temperature, activated duration time period expiration, and the like. Transitions between active states, of from active states to passive states, may be responsive to monitored operating conditions or command and may require authentication.

"Charging current" means electrical current that flows into the module from an external electrical source such as a charger, adding to the electrical energy stored in the module.

"Discharging current" means electrical current that flows from the module to an external electrical load, subtracting from the electrical energy stored in the module.

FIG. 1 is a representative diagram showing battery pack 5 having a pack controller 40 which is communicatively coupled to an authentication controller 50 by means of a communications link 45. Each pack controller 40 is assigned a unique ID at the time of manufacture. For embodiments of battery packs 5 which are installed in a vehicle, the authentication controller 50 may be a System Control Unit (SCU) being communicatively coupled to a vehicle key and communications link 45 may be Controller Area Network (CAN) bus or similar. For embodiments of battery packs 5 which are installed in stationary structures, such as charging stations or in-home energy storage units, the authentication controller 50 may be a remotely located data center having a database, and communications link 45 may be the Internet communicatively coupling the pack controllers 40 to the authentication controller 50. In some embodiments, the authentication controller 50 may be a cellular phone, which may further be communicatively coupled to an Internet database, and communications link 45 may be wireless.

A plurality of removable modules 10 are illustrated. Also illustrated are vacant sockets 25 to receive an additional module that is not illustrated. The illustration is simplified for clarity and is not numerically or otherwise limiting.

Pack controller 40 is communicatively coupled to control bus connectors 700 of modules 10 via control bus 70. The pack controller 40 is the source of commands that are received by each of controllers 900 comprised within modules 10.

The positive terminals 200 and negative terminals 300 of modules 10 are electrically coupled to positive power bus 20 and negative power bus 30 by means of sockets 25. External electrical load such as an inverter, or an external electrical source such as a charger, is customarily electrically coupled to power bus 20 and power bus 30. Such coupling of a battery pack power bus to an electrical load or source is well known in the art and is omitted from the illustration for brevity. Some embodiments of battery pack 5 may further employ power distribution devices coupled to power busses such as fuses, relays, isolation monitoring circuits, current sensors and the like. Such devices being coupled to a power bus of a battery pack are well known in the art and are not illustrated. In some embodiments, the internal relays and circuits of the modules of the present invention comprised in a pack will render additional pack power distribution devices unnecessary, resulting in a reduction in pack cost and complexity.

Figure 2:
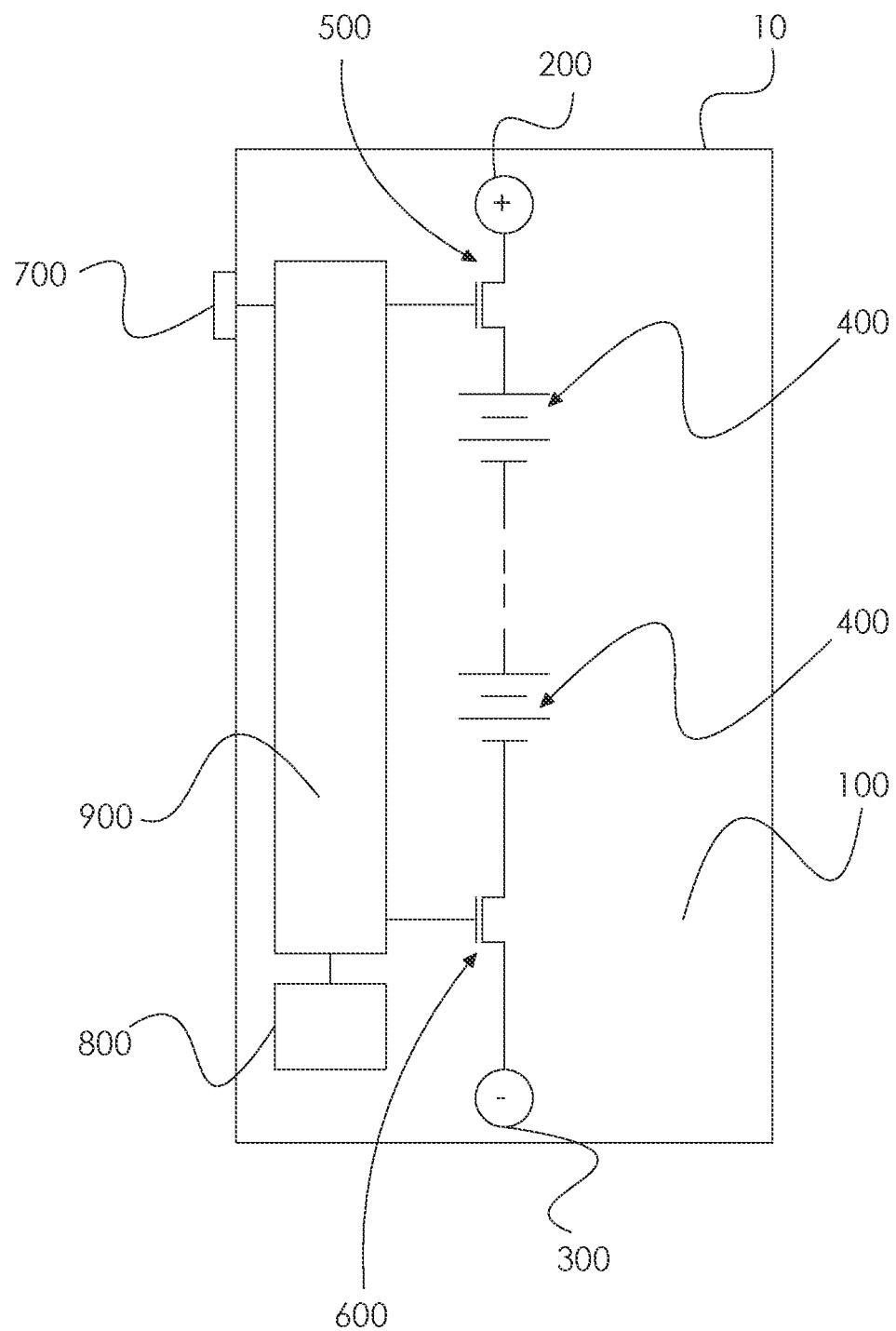
FIG. 2 diagrammatically illustrates a battery module of the present invention.

FIG. 2 is a conceptual illustration of the features of a battery module 10 of the present invention. The enclosure 100 is illustrated containing a plurality of cells 400, a positive terminal 200 being electrically coupled to said plurality of cells by relay 500, and negative terminal 300 being electrically coupled to said plurality of cells by relay 600. Relays 500 and 600 are controllably coupled to module controller 900, which is further communicatively coupled to control bus connector 700. Some embodiments of the present invention, which are not illustrated, may have only one relay to control the connection of the plurality of cells to only one of the terminals, while the other of the terminals is connected to the plurality of cells either directly or through a fusible link.

An optional operator interface 800 is diagrammatically illustrated being communicatively coupled to module controller 900. The operator interface may comprise visual indicators, pushbuttons, switches, audible indicators and the like, for the purpose of indicating module state and obtaining operator input. Operator interfaces are well known in the art and are not detailed herein. Some embodiments may omit an operator interface.

In some embodiments the operator interface 800 may not be physically comprised within the module, and may be a cellular phone configured with an operator interface app, said cellular phone being communicatively coupled to module controller 900 by a wireless link such as Bluetooth.

Figure 4:
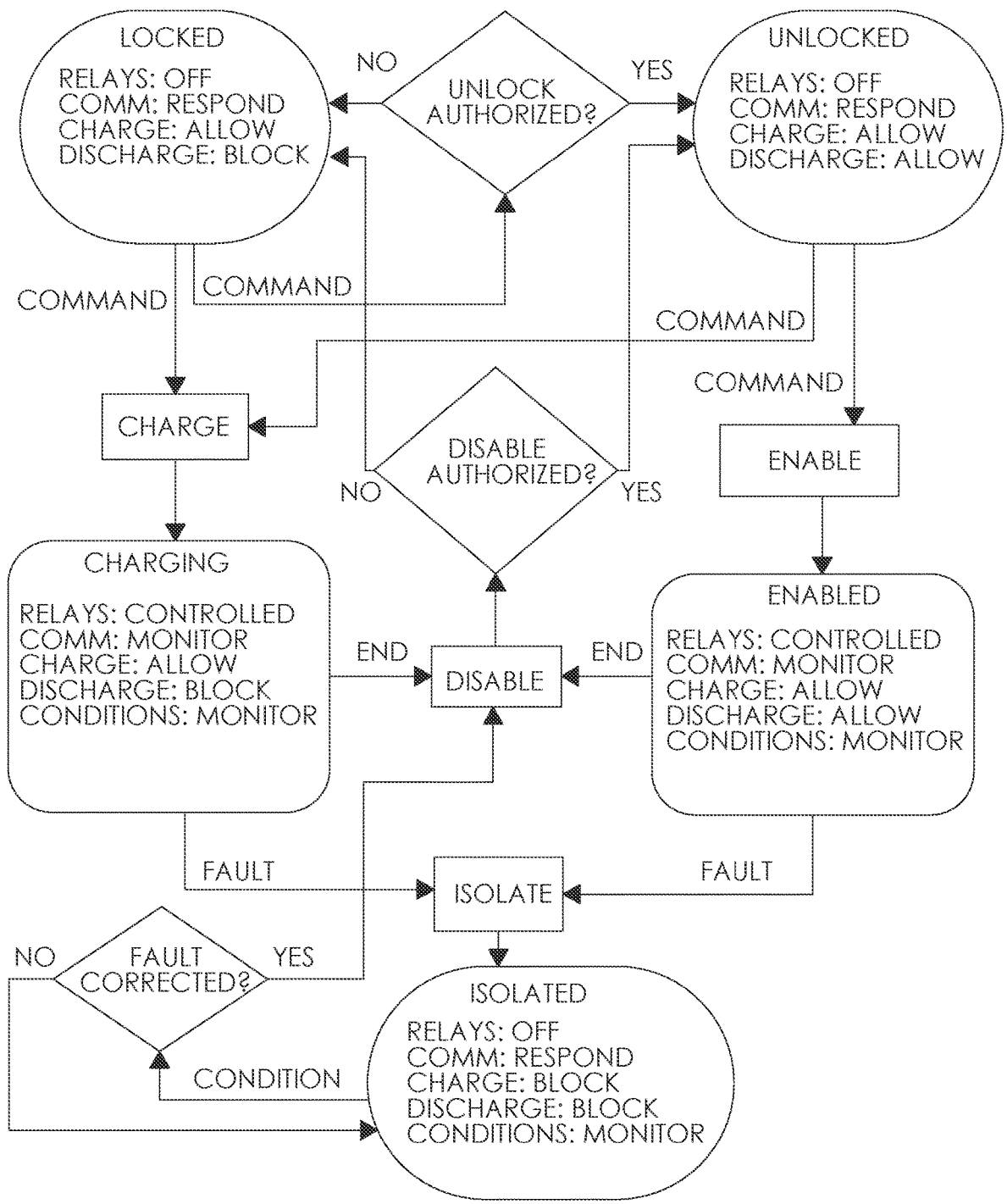
FIG. 4 is a state diagram showing the programmed states of a module of the present invention and the transitions between said states.

In embodiments having an operator interface, a module controller in a FAULT or LOCKED state (as illustrated in FIG. 4 and further described below) may periodically report its state by means of said interface. For example, a visual indication may be shown at predetermined intervals, such as an illuminated Light Emitting Diode (LED). In embodiments having a wireless link to the operator interface, the periodic indication may be by means of a wireless transmission.

Figure 3:
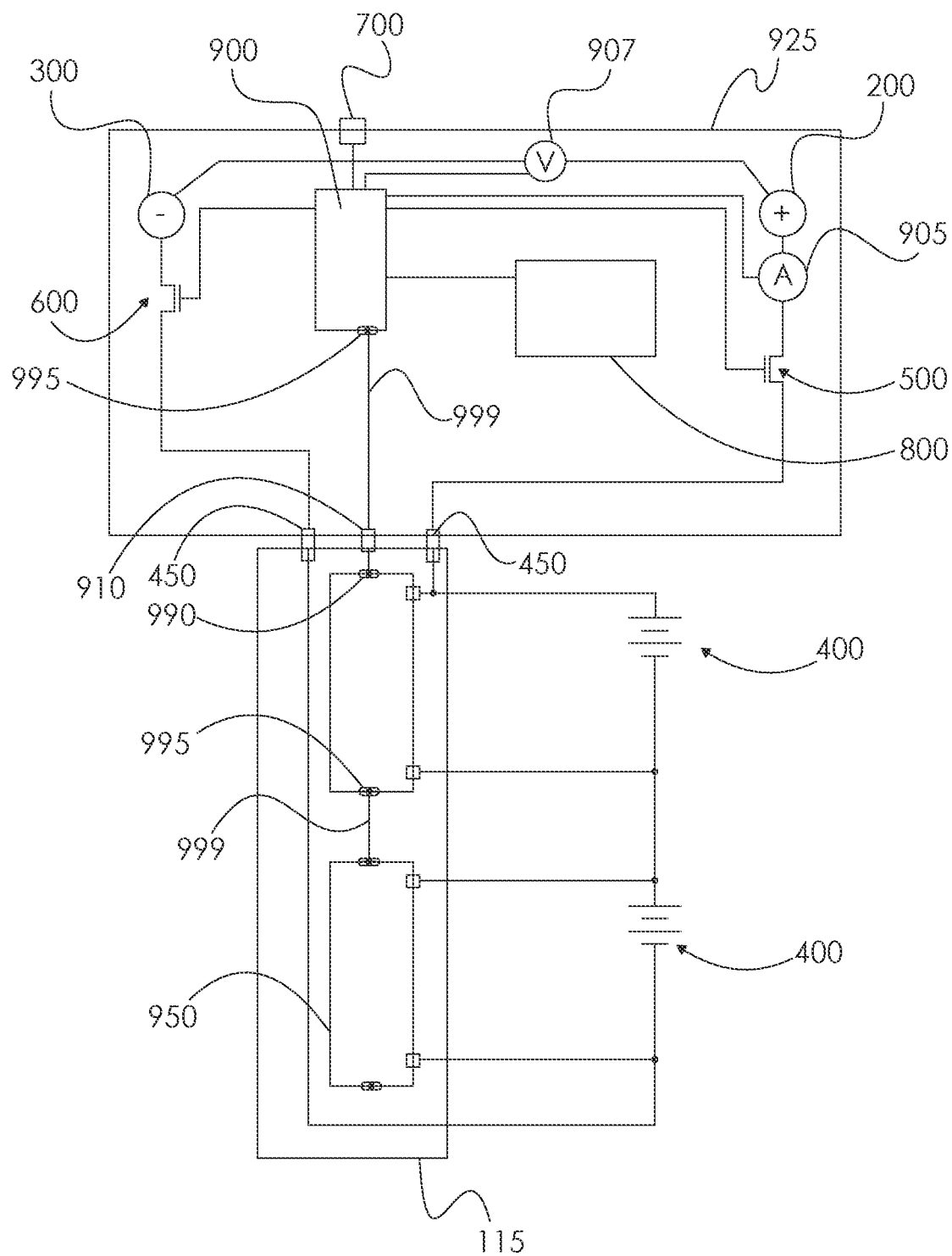
FIG. 3 shows an external interface PCBA comprising a module controller and associated circuitry, a cell monitoring PCBA having a plurality of cell monitoring and conditioning circuits, said circuits being coupled to a plurality of cells.

One embodiment of the electronic apparatus of a module 10 is illustrated in further detail in FIG. 3, comprising an external PCBA 925 and a module conditioning and monitoring PCBA 115. In other embodiments, the illustrated circuitry may be combined on a single PCBA. In still other embodiments, the circuitry may be distributed over a plurality of distinct assemblies, some of which may be flexible.

The external interface PCBA 925 is shown comprising positive terminal 200, negative terminal 300, battery module controller 900, control bus connector 700, connectors 450 for electrically coupling to cells 400, and communication connector 910 for communicatively coupling to PCBA 115 and the cell monitoring and conditioning circuits 950 comprised therein.

An optional operator interface 800 is illustrated being communicatively coupled to the module controller 900, however some embodiments may omit an operator interface.

A current sensor 905 is illustrated as being coupled to the positive terminal 200, other embodiments may couple a current sensor to negative terminal 300. A voltage measurement circuit 907 is shown connected to terminals 200 and 300. In some embodiments, voltage measurement circuit 907 may be internal to module controller 900. Relays 500 and 600 are also shown. Other embodiments may have additional relays to connect multiple groups of series-connected cells in series or in parallel with each other. Such configurations are disclosed in the referenced application not illustrated herein for brevity. Some additional embodiments may omit one of the relays 500 and 600 without departing from the scope of the present invention and are likewise not illustrated herein.

In some embodiments, relay 500 may be of a first type, and relay 600 may be of a second type. For example if the first type of relay is electromechanical it provides complete galvanic isolation when open. However, electromechanical relays are relatively slow to respond. If the second type of relay is solid state, which responds to control input very quickly, it can be used to rapidly open the circuit if current sensor 905 detects excessive current. Some solid state relays may not provide complete galvanic isolation. By utilizing two distinct types of relays, a PCBA 925 can provide both full galvanic isolation and fast response to variations in measured current.

In some embodiments, the current sensor 905 may be of Hall Effect type, and may sense both magnitude and direction of current.

Circuits 950 are communicatively coupled to each other and to module controller 900 by means of uplink ports 990 and downlink ports 995, connected by communication links 999. Details of the circuits 950 are disclosed in the referenced application and are not illustrated here. Pertinent to the methods disclosed herein, circuits 950 measure the individual voltages of cells 400 and communicate the results of the measurements to module controller 900 by means and methods disclosed in the referenced application.

A control bus port 700 is provided for communication with an external controller such as pack controller, Vehicle Controller Unit (SCU), charger and the like.

In some embodiments, terminals 200 and 300, and control bus port 700, may be combined into a single physical connector.

Additional low voltage power connector may be provided in some embodiments to power the module controller 900 and relays 500 and 600 independently of the cells 400, and may further be combined into a single physical connector with the terminals and the control bus port.

FIG. 4 is a representative state diagram showing programmed states of an embodiment of a battery module of the present invention, the representative functionality associated with each state, and the transitions between the states. FIG. 4 is illustrative and not limiting.

A battery module is configured to have distinct programmed states by means of storing an executable program in non-volatile memory associated with module controller 900, and then executing said program. Such programs, means of storing them in non-volatile memory, and means of securely updating them via a communications link are well known in the art of controllers and are not detailed herein. Non-volatile memory for storing an executable program is customarily provided in controllers known in the art.

The illustrated states are of two types: passive states, which include LOCKED, UNLOCKED and ISOLATED, and active states which include CHARGING and ENABLED. The names of the states used herein are descriptive for the purpose of distinguishing between the illustrated states and are not limiting.

In active states, one or more relays are actively controlled by module controller 900 responsive to monitored operating conditions and further responsive to any programmed parameters associated with the specific state. Control bus port 700 is monitored for reception of valid command messages by the module controller 900. Time since reception of the most recent valid command message is compared to a predetermined timeout period. This functionality is indicated in the diagram of FIG. 4 by the COMM: MONITOR legend. Monitored operating conditions may include magnitude and direction of current measured by current sensor 905, terminal voltage measured by voltage sensor 907, individual cell temperature and voltage reported by each of circuits 950, and the like.

In passive states, all relays are turned off and the plurality of internal cells 400 are electrically isolated from the terminals 200 and 300. The module controller 900 may be active, in a low power condition or powered down.

Transition from one state to another state may be initiated by the module controller 900 responsive to a valid command from an authorized pack controller 40 (FIG. 1). An authorized pack controller 40 has a unique ID which is on a list of authorized pack controllers maintained by the module controller 900. In embodiments wherein multiple lists of authorized controllers are maintained, each list may correspond to a specific set of state transitions the listed pack controllers 40 are authorized to command, which may be distinct from the set of state transitions that controllers listed on another list are authorized to command.

In some embodiments a list of authorized pack controllers may contain additional data associated with each authorized pack controller 40, which may be used to further authorize or restrict state transitions that may be commanded by the pack controller 40. A list may be maintained in non-volatile memory comprised in the module controller 900, or another circuit comprised within the module 10.

In some embodiments, a pack controller 40 may further maintain a list of module controller IDs that have been connected to the pack. Such a list may further contain data on module usage, and whether a module has been removed without authorization.

Both pack controller lists maintained by module controller and module controller lists maintained by pack controller, along with any associated data, may be periodically uploaded to a database, which may be communicatively coupled to an authentication controller 50 (FIG. 1).

The module controller 900 (FIG. 2) may transition from a passive state to another passive state responsive to a monitored condition. From a passive state, the module controller 900 may only transition to an active state responsive to a valid command from an authorized pack controller 40.

A module controller 900 may transition from an active state to another active state responsive to a monitored condition or a valid command from an authorized pack controller 40.

A module controller 900 may transition from an active state to a passive state responsive to an end condition, a fault condition, or a command.

In some embodiments the illustrated end condition may be defined as receiving a valid disable command, reaching a predetermined module voltage threshold, reaching a predetermined module current threshold, reaching a predetermined module temperature threshold, or any other programmed combination of monitored operating conditions. In the illustrated embodiment, an end condition is indicative of ordinary use, does not require corrective action and does not preclude further ordinary use of the module.

Upon reaching an end condition, the module is disabled by transitioning to a passive state. Authentication steps may be attempted during the transition to determine whether the module should be placed in a specific passive state which may allow or restrict certain subsequent state transitions without further authentication.

In some embodiments the illustrated fault condition may be defined as crossing a predetermined module voltage threshold, exceeding a predetermined module current threshold, detecting unauthorized discharge current, exceeding a predetermined module temperature threshold, exceeding a timeout period without receiving a new valid command, or any other programmed combination of monitored operating conditions. In the illustrated embodiment a fault condition is indicative of faulty, unauthorized or dangerous use that may require corrective action and precludes further ordinary use of the module 10 (FIG. 1) until the condition is corrected.

For example, unauthorized physical removal of a module from a pack without authenticating such removal would result in the module transitioning to a LOCKED state. This, in the illustrated embodiment, would allow the module to be charged but would require further successful authentication before the module can transition to an ENABLED state.

FIG. 4 further shows a list of representative module functionality that is associated with each illustrated module state.

The illustrated embodiment allows charging of a module that is in a LOCKED state in order that a module may be maintained in a safe state of charge even in the absence of authentication. In other embodiments, the transition to CHARGING state may require authentication to further deter unauthorized use or to ensure compatibility of the module with the charging apparatus. This may be particularly desirable for modules that are capable of being configured to operate at more than one voltage, as disclosed in the referenced application.

Some embodiments may have a plurality of active states, each having distinct programmed parameters. For example, embodiments may have a plurality of CHARGING states having distinct charging current limits associated with each state, which may be responsive to measured conditions such as voltage and temperature, and may further be responsive to authentication.

Some embodiments may have a plurality of ENABLED states having distinct charging current limits and discharging current limits associated with each state, which may be responsive to measured conditions such as voltage and temperature, and may further be responsive to authentication.

Embodiments may have a plurality of passive states, including states having an associated list of known pack controllers 40 (FIG. 1) that are authorized to command a transition to another state. Such authorized pack controller lists may be stored in nonvolatile memory comprised in the module controller 900 or another electronic circuit comprised in PCBA 925 or PCBA 115, and may further be encrypted.

A list of authorized controllers 40 may be received by a secure message, compiled through previous authenticated installations as disclosed herein, or by another method such as programming during manufacture of the module.

In some embodiments of programmed states, only pack controllers 40 that are identified on a specific authorized list, or have specific authorization attributes recorded in the list, may command transitions to another state. In such states commands from pack controllers not identified on the list are disregarded.

In some embodiments of programmed states, pack controllers that are not on an authorized pack controller list may be enabled to issue state transition commands to specific other states without requiring authentication. The illustrated LOCKED state is an example of such a restricted state wherein the transition to the CHARGING state may be commanded by unauthorized or restricted pack controllers, but the transition to the UNLOCKED state may only be commanded by an authorized pack controller. This is useful when communications links necessary for authentication are not available.

In passive states, the receipt of a command message by the module controller 900 via control bus port 700 triggers the processing of the message by the controller and a corresponding response. This functionality is indicated in the diagram of FIG. 4 by the COMM: RESPOND legend. In some embodiments wake-on-comm functionality may be used to bring the module controller 900 out of a powered down or low power condition upon receipt of a command message. Wake-on-comm functionality is well known in the art of controllers and is not described in detail herein.

In other embodiments low voltage electrical power may be supplied to the module controller 900 via control bus port 700 prior to the receipt of a command message by the controller.

Figure 5:
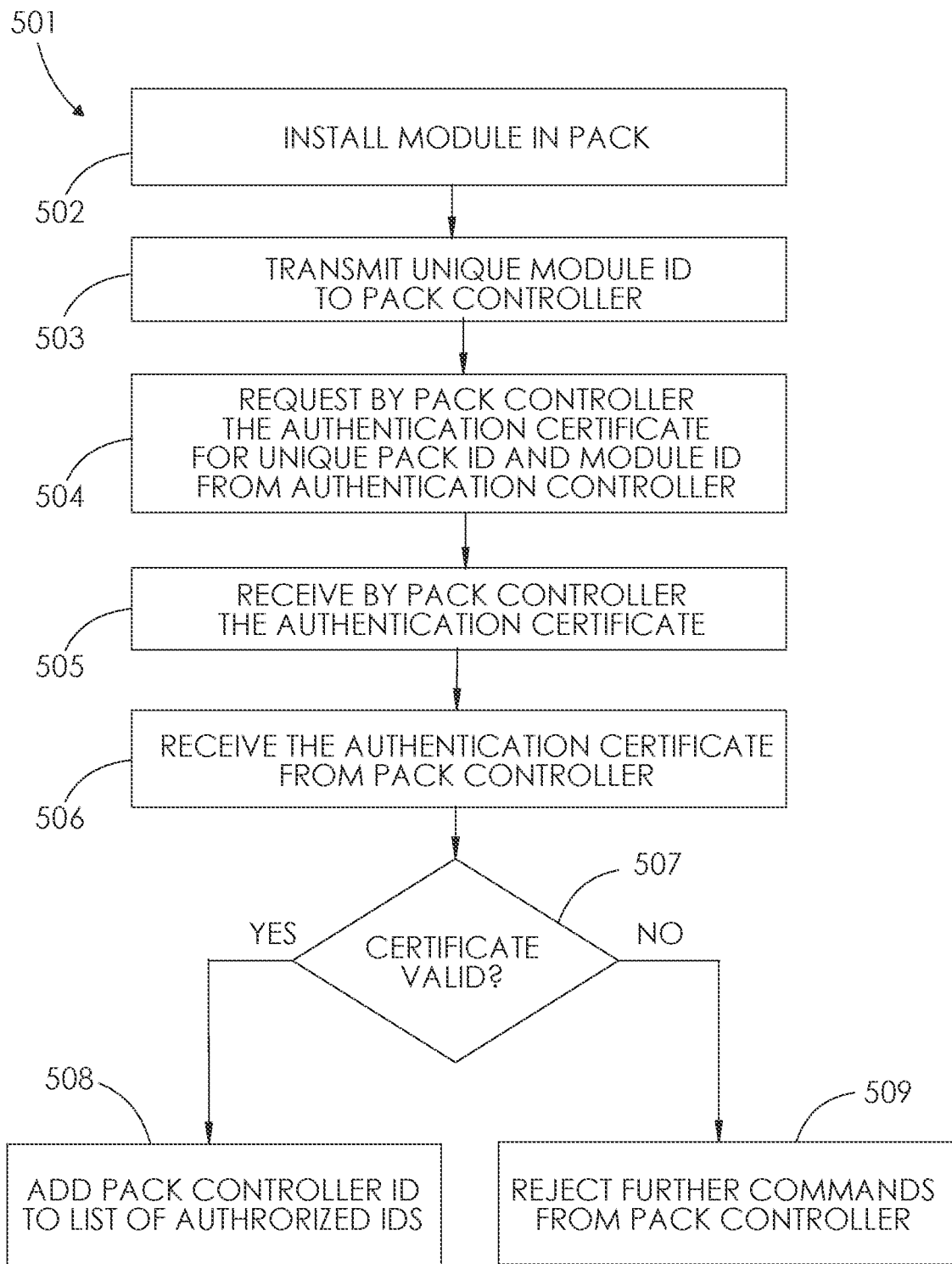
FIG. 5 illustrates the authentication method of the present invention.

A flow chart 501 for a method of authenticating a command source is illustrated in FIG. 5. It should be noted that in some alternative implementations, the functions noted in the blocks may occur out of the order noted in FIG. 5, may include additional functions, and/or may omit some functions. For example, two blocks shown in succession in FIG. 5 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

Upon installation of a module into a pack at block 502, the unique module ID (MIN) is then transmitted to the pack controller at block 503. At block 504, the pack controller 40 requests an authentication certificate from the unique pack ID and module ID from the authentication controller 50. Then, at block 505, the pack controller 40 may then obtain an authentication certificate from the authentication controller, which in some embodiments may be a secure message configured to be readable by the module controller having the specific MIN. As a step in the process of obtaining the authentication certificate, the pack controller may transmit its unique pack ID to the authentication controller, to be included in the authentication certificate. Methods of obtaining such secure messages are well known in the art of secure communications. The authentication certificate may further contain information such as the vehicle ID (VIN) or product ID (PIN) associated with the battery pack in which the module has been installed.

Once obtained, the authentication certificate is communicated by pack controller 40 to the specific module 10 to authenticate the identity of the pack controller 40 to the module controller 900 comprised within the module at block 506, said controller 900 having the unique MIN for which authentication certificate was obtained. At block 507, a determination is made whether the certificate is valid. Once authenticated (the YES condition), the unique ID of the pack controller 40 at block 508 may be added by the module controller 900 to a list of authorized command source IDs, in order that further authentication not be required for commands received from the pack controller having said unique ID. If not authenticated (the NO condition), further commands from the pack controller 40 are rejected at block 509.

A pack controller 40 having a unique ID which has been successfully authenticated and added to a list of authorized command source IDs is referred to as an authorized controller in the descriptions provided herein. A pack controller having a unique ID that has not been successfully authenticated may be added by means of steps further disclosed below, and is referred to as a restricted controller in the descriptions provided herein.

Figure 6:
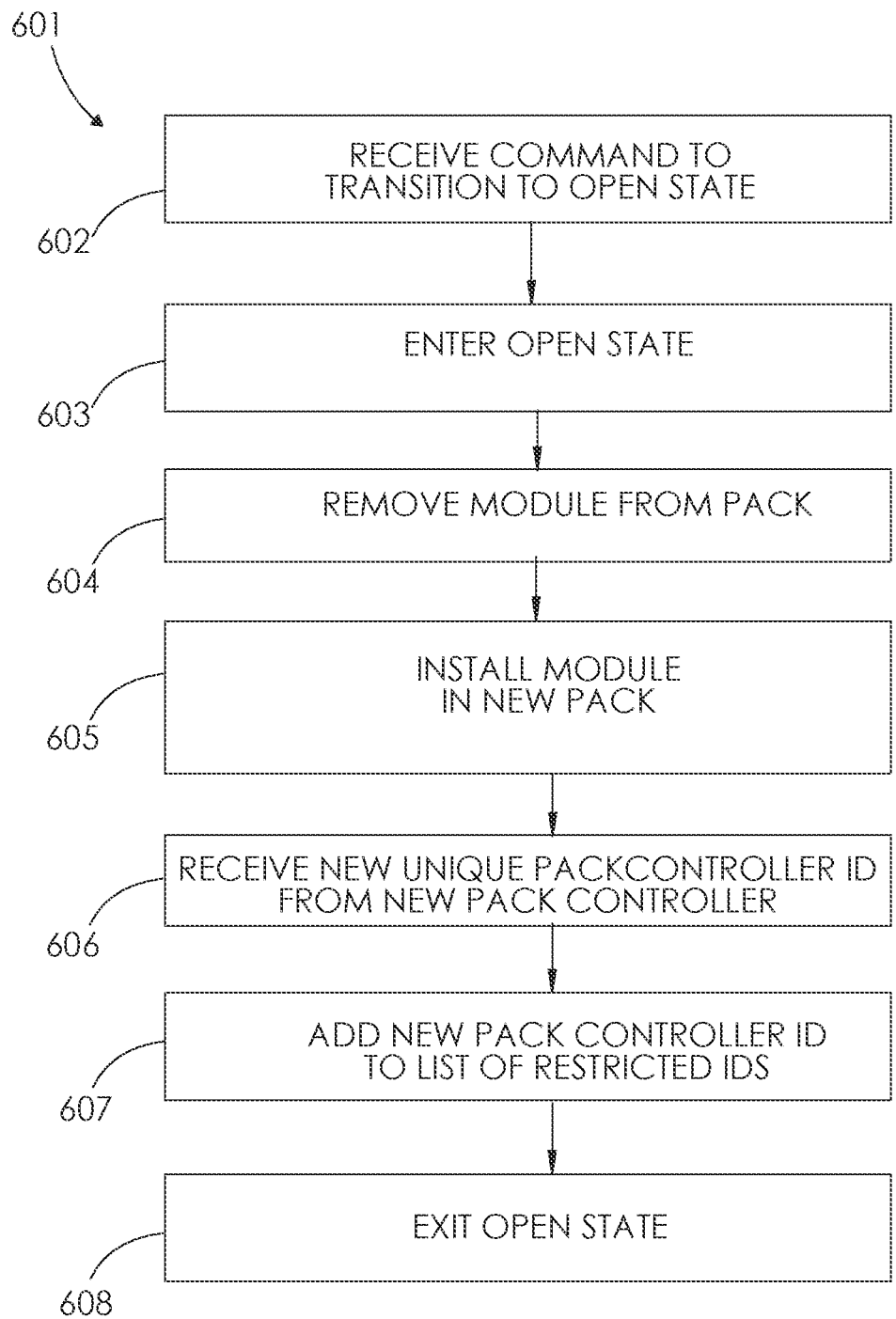
FIG. 6 is a diagram of additional steps of the authentication method.

Further steps of the authentication method are illustrated in the flow chart 601 in FIG. 6. It should be noted that in some alternative implementations, the functions noted in the blocks may occur out of the order noted in FIG. 6, may include additional functions, and/or may omit some functions. For example, two blocks shown in succession in FIG. 6 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure.

The functions illustrated in the blocks of FIG. 6. facilitate the addition of new pack controllers 40 (FIG. 1), which do not have an available communications link to an authentication controller 50, to a list of restricted pack controllers from which some commands may be accepted without requiring authentication. In some embodiments such a list may be distinct from the list described in block 508 (FIG. 5). In other embodiments the list may be the same list described in block 508, but with additional information pertaining to command restrictions associated with the newly added pack controller ID.

An authorized pack controller 40 may issue a command at block 602 to the module controller 900 to transition the module to a specific static state, herein descriptively referred to as OPEN, in which the next pack controller 40 placed in communication with the module will be added to the list of restricted command source IDs without the requirement to authenticate the identity of the new pack controller, albeit with restrictions on specific commands that the new restricted controller may issue.

After a module transitions to the OPEN state at block 603, it is removed from the authorized pack at block 604 and installed in a new pack at block 605. The unique pack ID is then obtained from the new pack controller 40 at block 606 and added to a list of restricted pack controller IDs at block 607. Upon completion of the above steps, the OPEN state is exited at block 608.

An example of the restrictions that may be associated with a restricted controller is disregarding commands from the newly added pack controller to transition to OPEN state. Such a restriction would ensure that only authorized pack controllers can command a module to transition to the OPEN state. This example is illustrative and not limiting. Other restrictions may be implemented in some embodiments, as appropriate to the embodiment. Some embodiments may further implement different levels of restrictions for different restricted controllers.

In some embodiments, operator input via an operator interface may be further required as part of the authentication process. This input may include selecting options from an on-screen menu, entering a passcode, sensing operator biometrics, and the like. Many such authentication methods and operator interfaces are known, including handheld devices with wireless communications, and are not described in detail herein. The embodiments disclosed herein are illustrative and not limiting; other embodiments shall be readily apparent to those skilled in the art based upon the disclosures made herein, without departing from the scope of the present invention.

Continuation in Part Disclosure

In a vehicle configured with a battery pack 5 (FIG. 1) having a plurality of sockets 25 for removable modules 10, it is desirable to be able to install modules 10 having characteristics that may be dissimilar from those of one of more of other modules 10 installed in the battery pack 5. Such characteristics may include state of charge, voltage, cell type, cell chemistry, energy storage capacity, charge and discharge current capability, and the like. Such characteristics are collectively and interchangeably referred to as "Module Capacity" in the following disclosures. Key characteristics of Module Capacity are State Of Charge (SOC) and State Of Health (SOH). SOC is a numeric representation of the total available electrical energy in a module at a given time, and may be represented as a percentage of maximum energy that the module is capable of storing or as a direct numeric representation of the available energy. SOH is a numerical representation of physical degradation of a module due to age, number of cycles, physical damage, temperature and other factors. SOH may be represented as a percentage of maximum performance the module is capable of, or another like metric.

Many techniques for calculating Module Capacity are known in the art, as exemplified by those described by Heeger et al. in Sandia National Laboratories Report SAND2017-10722. The novel configuration of modules 10 (FIG. 2, FIG. 3) disclosed herein facilitates accurate measurements and calculations of Module Capacity due to the unique ability to directly and individually monitor each of the series-connected cells 400 by means of the corresponding cell monitoring and conditioning circuits 950. The novel methods disclosed hereinbelow facilitate the use of such calculations in predicting and controlling the performance of a vehicle power system having a plurality of modules 10 of dissimilar Module Capacity, and for controlling the connection of each module 10 to the positive power bus 20 and the negative power bus 30 (FIG. 1) while in a CHARGING or ENABLED active state (FIG. 4). The positive power bus 20 and the negative power bus 30 are collectively referred to as "power bus" hereinbelow.

The exact nature of calculations of Module Capacity, including the SOC and SOH characteristics, is dependent on the details such as cell chemistry, cell type, module physical construction, available cooling capacity and the like. Therefore the techniques for carrying out such calculations, as exemplified by Heeger et al., are not detailed herein. Embodiments utilizing any known techniques for calculating Module Capacity are intended to be included within the scope of the disclosures and to be protected by the claims made herein.

The novel configuration of the modules 10 of the present invention, having all cells 400 connected in series only, enables precise monitoring of each cell 400 individually, thereby improving the accuracy and fidelity of calculations. Such individual monitoring is not possible when cells are connected in parallel within a module due to inability to measure the voltage of each cell individually, but only as a group.

In the prior art, several solutions to parallel connection of battery modules of dissimilar Module Capacity are known. In U.S. Pat. Nos. 9,315,113 and 9,694,707, Shrinkle teaches battery modules having bidirectional buck regulators utilizing transistors and an inductor to control the current flowing into and out of each module. Such regulation incurs an energy loss in both charge and discharge modes, thereby generating undesirable heat. The approach also carries additional expense, complexity and increased physical size of the modules, all of which are undesirable.

In U.S. Pat. No. 10,333,328 Hom et al. teach a battery charging station for a plurality of modules, wherein individual modules are enabled or disabled during charging by a central charge controller until equal Module Capacity is achieved among installed modules. Such an approach does not provide a solution for modules of dissimilar Module Capacity that are installed in a vehicle and need to be used without the opportunity to first charge all of the modules.

The above referenced prior art solutions do not take into account or utilize the fact that an electric system component of a vehicle is not a constant electrical load but one that is controlled by the System Control Unit (SCU) responsive to control inputs from vehicle Operator.

Figure 7:
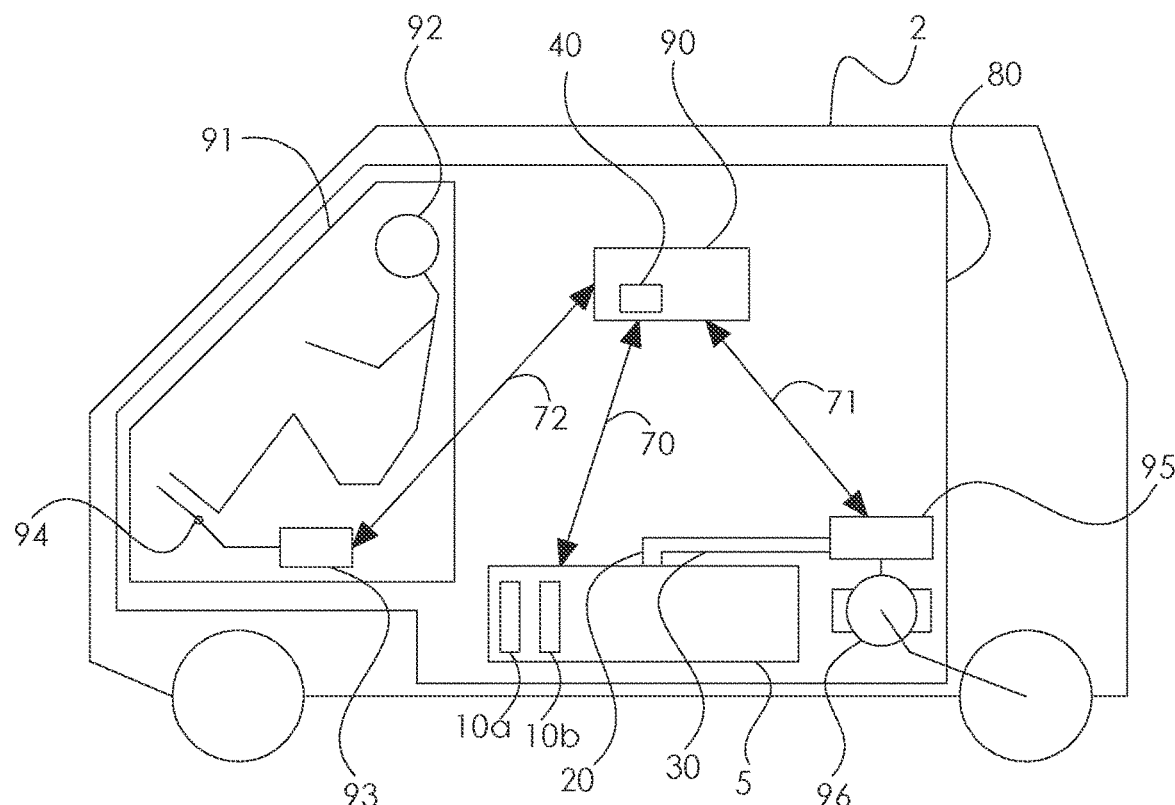
FIG. 7 is an illustration of an embodiment of a power system for a vehicle, said power system utilizing a plurality of battery modules.

An embodiment of a power system for a vehicle is illustrated in FIG. 7. The vehicle 2 illustrated in FIG. 7 is a wheel-driven ground vehicle. It shall be apparent to those skilled in the art how the disclosures made herein may be applied to ground vehicles that utilize tracks or articulated limbs, as well as vehicles that are aircraft, watercraft or spacecraft, and therefore such further illustrations are omitted herein for brevity.

It should be understood that the system component 96 shown as a traction motor in the illustrative embodiment in FIG. 7 is not limited to a traction motor. As used herein, "system component" may, in some embodiments, be a rotary or linear actuator, an energy conversion unit such as a heating or a cooling element, a hydrogen fuel cell, a battery charger, a generator, and the like. In some embodiments system component 96 may be utilized for controlling one or more mechanical elements such as control surfaces of an aircraft, apparatus of material handling equipment and/or other electrically powered or electric power sourcing systems. A plurality of system components 96 and corresponding PCUs 95, which may be of different types, may be present in some embodiments. All such modifications and variations are intended to be included herein within the scope of this disclosure.

FIG. 7 shows a vehicle 2 having a power system 80 under the direction of an Operator 91. As used herein, "vehicle Operator" and "Operator" refer interchangeably to a control entity substantially directing the movement of the vehicle. In some embodiments, Operator 91 may be a human operator 92 and may be onboard the vehicle or directing it remotely. In other embodiments, Operator 91 may be an Electronic Operator Unit (EOU) 93 which is an electronic controller executing a control program and may incorporate aspects of Machine Learning (ML). Many examples of EOUs 93, including those incorporating ML, are known in the art. In yet other embodiments, Operator 91 may be a combination of a human operator 92 and EOU 93 operating together at one of the six Autonomy Levels as currently defined by the Society of Automotive Engineers (SAE), or one of the Autonomy Levels For Unmanned Systems (ALFUS) as defined by the National Institute of Standards and Technology, or another like classification.

The power system 80 illustrated in FIG. 7 further comprises a System Control Unit (SCU) 90, a modular battery pack 5 further comprising removable vehicle battery modules 10a and 10b, and a Power Control Unit (PCU) 95 controlling a system component 96 which is an electric propulsion motor. The configuration of the vehicle 2 shown in FIG. 7 is illustrative and not limiting. In particular, configurations of vehicle 2 having a plurality of PCUs 95 and electric motors 96 shall be readily apparent to those skilled in the art based on disclosures made herein. Embodiments may further comprise a plurality of PCUs 95 controlling a plurality of system components 96 which may be battery chargers, generators, actuators and the like.

The SCU 90 is shown as further comprising a pack controller 40. In some embodiments, pack controller 40 may be one or more software routines executed by the SCU 90 to implement the necessary functionality. This configuration is illustrative and not limiting. Other embodiments having a pack controller 40 that is distinct from, and is communicatively coupled to, the SCU 90 are possible within the scope of the present invention.

The herein disclosed functionality of SCU 90, EOU 93 and/or PCU 95 may, in some embodiments, be combined into a single physical computing unit without departing from the scope of the present invention. The EOU 93 directs the movement of the vehicle, either autonomously or responsive to inputs from the human operator 92 received via the human interface 94. As part of directing the movement of the vehicle, EOU 93 issues power requests to the SCU 90. In accordance with the novel methods disclosed hereinbelow, the SCU 90 receives power requests from the EOU 93, assesses the overall Pack Capacity of battery pack 5 and the overall Power Demand expected from the PCU 95, and issues power commands to the PCU 95.

As used herein, a "power request" is an electronic signal, which may be an analog signal or a digital message responsive to an input by the vehicle Operator 91, issued from the EOU 93 to the SCU 90, requesting that the power system 80 deliver system component power of desired magnitude and in the desired direction. A power request is fulfilled by the power system 80 subject to the limitations of its capacity to do so, in accordance with the methods of the present invention.

A "power command", as used herein, is an electronic signal, which may be an analog signal or a digital message, issued by the SCU 90 to the PCU 95 to produce the commanded system component power level in the commanded direction. In some embodiments, a power command may be issued as a torque command which at a particular rotational speed specifies a resulting power level. In other embodiments, a power command may command a particular voltage which at a given current specifies a resulting power level. In other embodiments, a power command may command a particular current which at a given voltage specifies a resulting power level.

The SCU 90 generates power commands to the PCU 95 in a manner that assures the Power Demand does not exceed Pack Capacity in accordance with the methods of the present invention as further disclosed hereinbelow. The PCU 95 receives power commands from the SCU 90 and controls the system component 96 to generate system component power, drawing electrical energy from the battery pack 5 in the case of discharging system component power, or returning energy to the battery pack 5 in the case of charging system component power.

As illustrated, the PCU 95 is connected to the modular battery pack 5 by the positive power bus 20 and the negative power bus 30. Each removable module 10 (illustrated as 10a and 10b in FIG. 7) is controllably coupled to the positive power bus 20 via positive terminal 200 and relay 500 (FIG. 2), and to the negative power bus 30 via negative terminal 300 and relay 600 (FIG. 2).

As used herein pertaining to operation of a relay, the terms "turned on" and "closed" are used interchangeably to indicate controlling the relay to enable the conduction of electrical current by the relay, and the terms "turned off" and "opened" are used interchangeably to indicate controlling the relay to prevent the conduction of electrical current by the relay.

In the illustrated configuration, the SCU 90 is communicatively coupled to the EOU 93 by a communications bus 72. In embodiments wherein the SCU 90 and the EOU 93 are combined in a single computing unit, the communications bus 72 may be virtual and implemented as a messaging protocol between software subroutines implementing the respective functionality. The SCU 90 is further communicatively coupled to each of the modules 10 installed within the modular battery pack 5 by a communications bus 70. The SCU 90 is further communicatively coupled to the PCU 95 by a communications bus 71. It should be understood that the communications busses 70, 71 and 72 may each be wireless, wired, or utilize powerline communications (PLC) by coupling the communications signals to either or both of the positive power bus 20 and the negative power bus 30. The signals associated with one or more of the communications busses 70, 71 and 72 may be carried over the same physical medium in some embodiments. In other embodiments, communications busses 71 and/or 72 may be implemented virtually.

In the illustrated embodiments, the battery pack 5 is shown as a single unit for brevity. It should be understood that embodiments having a plurality of sub-packs that are distributed in several locations within a vehicle 2 are possible. In such embodiments, the terms "battery pack 5" and "pack 5" as used herein refer to the aggregate combination of all sub-packs within the vehicle 2.

In some embodiments, human operator 92 provides control inputs to EOU 93 by means of human interface 94. Human interface 94 may comprise one or more controllers, such as, but not limited to, one or more pedals, a steering wheel, a joystick, one or more pushbuttons or other manual actuators, switches, one or more visual displays, one or more touch sensitive displays, one or more cameras and/or one or more audio transducers. Some embodiments of human interface 94 may, under control of a computer, enable voice recognition and synthesis, facial recognition, gesture recognition, and the like.

Figure 12:
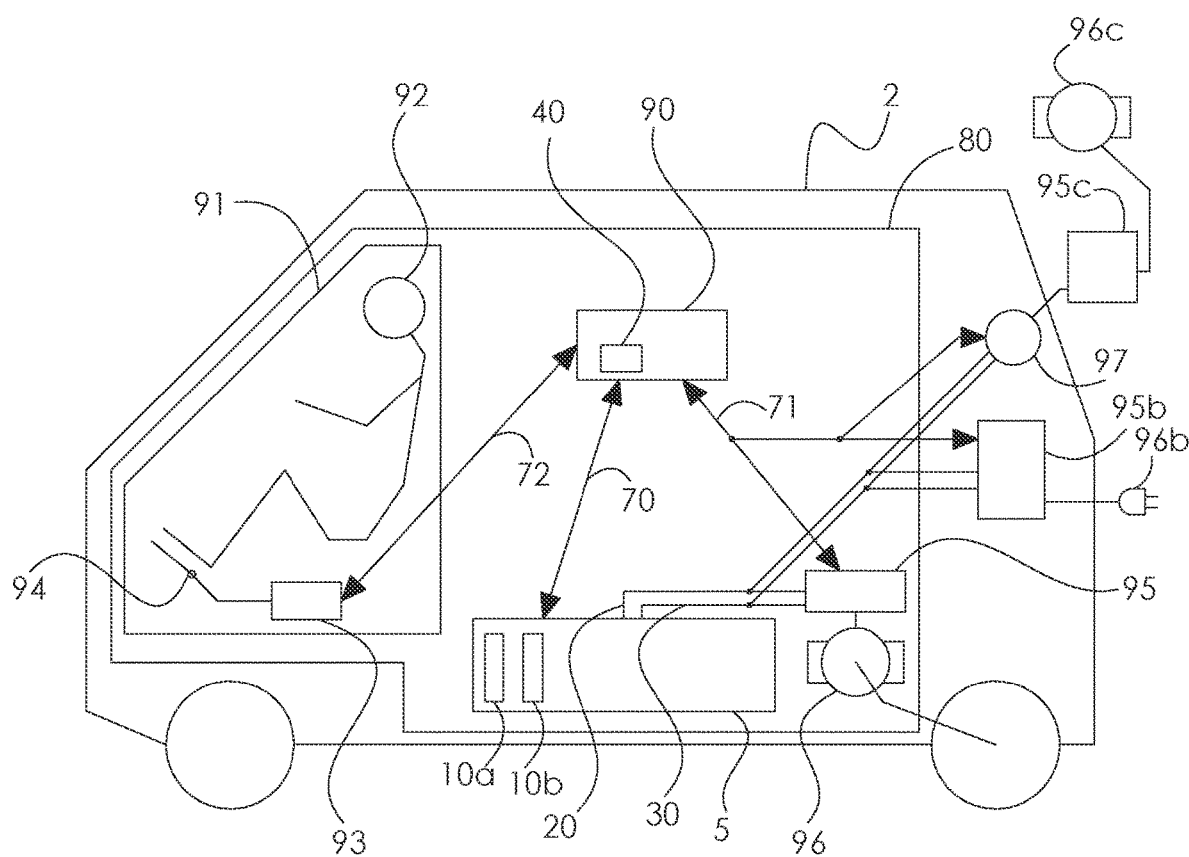
FIG. 12 illustrates an embodiment of a power system for a vehicle of FIG. 7 further having an onboard battery charger and further being connected to an external battery charger.

A further illustrative embodiment of is shown in FIG. 12, with vehicle 2 further having an onboard battery charger 95b being coupled to a system component which is an external power source 96b, and further being connected to an external battery charger 95c via a connection port 97, said external battery charger 95c being coupled to a system component which is a generator 96c.

Figure 13:
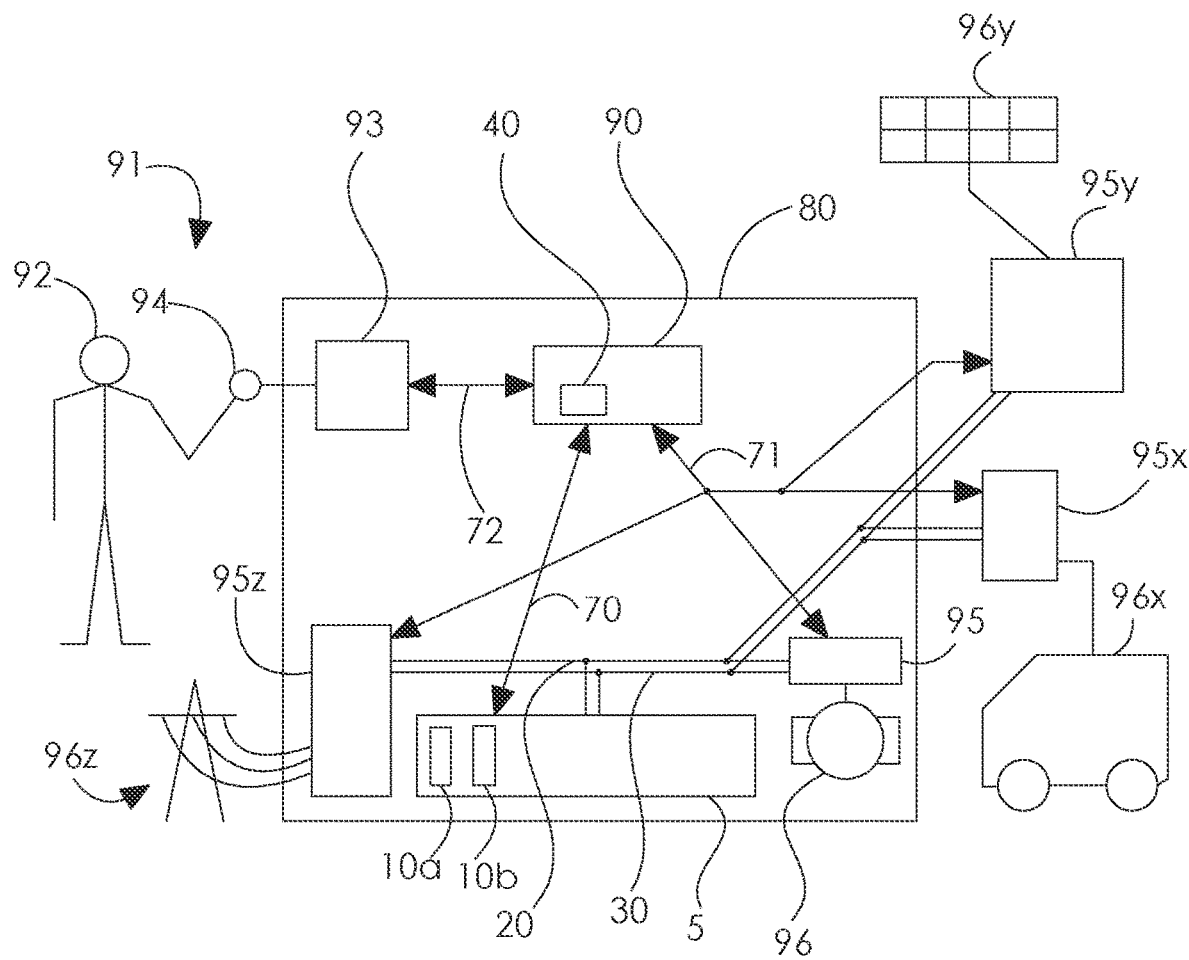
FIG. 13 shows a power system for a building or another stationary application, said power system utilizing a plurality of battery modules and having a plurality of system components of different types.

FIG. 13 further shows an embodiment of the power system of the present invention being utilized in a stationary installation that is not a vehicle. Examples may include power systems for buildings, vehicle charging stations, renewable energy storage facilities and the like. In the illustrated embodiments, the system Operator may be the EOU 93, and may further comprise a human interface 94 such as a control terminal for input by a human Operator 92.

In such embodiments, system component 96 may be a Heating, Ventilation and Air Conditioning (HVAC) unit, a pump, and the like, being coupled to the PCU 95. Additional types of system components illustrated in FIG. 13 are vehicle 96x being coupled to a battery charger 95x, a solar array 96y being coupled to an array controller 95y, and an external power grid connection 96z being coupled to a voltage converter 95z. Many other embodiments shall become apparent to those skilled in the art based on the disclosures made herein.

As used herein, "Data Map", "Module Capacity Data Map", "Power System Data Map", "Power Demand Data Map" refer to a set of electronic data, which may be stored in a nonvolatile memory of an electronic controller, that describes the ability of the associated component of the power system 80 to deliver or absorb electrical energy over a predetermined range of operating conditions. A Data Map may contain any combination of predetermined, calculated and measured data, including measurements of parameters indicative of the state of the system or component to which the Data Map pertains at a particular time. Such parameters may include voltage, current, temperature, rotational speed and the like.

A Data Map may contain historical data pertaining to periodic points in time and/or pertaining to events such as operating conditions that are outside a predefined range. Such historical data may be referenced in calculating SOC, SOH and other parameters for estimating the likely future performance of a system or component to which the Data Map pertains.

In some embodiments, portions of a Data Map may be stored, transmitted and utilized separately from other portions of the Data Map. In particular, in some embodiments only the changed portions of a Data Map may be transmitted in order to reduce communications delays. Portions of a Data Map may be stored in non-volatile memory, while other portions of the Data Map may be stored in volatile memory.

The novel methods disclosed hereinbelow of operating a power system 80 of a vehicle 2 utilize Data Maps associated with each of the components and sub-components of the power system 80 to generate power commands to the corresponding PCU 95 responsive to movement directives and other operational directives received from EOU 93.

Embodiments of control systems reference a Data Map to control a power system of a vehicle. For example, controlling an internal combustion engine of a vehicle is accomplished with reference to a Data Map containing data values for ignition and fuel injection timing corresponding to specific engine speeds and throttle plate positions. Corrections to map data are computed responsive to measurements such as air pressure, air temperature and the like.

As used herein, a Data Map may contain one or more multi-dimensional data tables which comprise specific data values for each combination of relevant operating conditions such as temperature, voltage, vehicle speed and the like. Interpolation and other calculations may be carried out on the data comprised in a table. Additionally, a Data Map may comprise equations, executable algorithms, correction factors, measurement results and other data which may be used to compute data for combinations of operating conditions not explicitly recorded in a table. In many embodiments a Module Capacity Data Map (MCDM) will contain data for SOC and SOH, which may be periodically updated based on measurements.

Figure 8:
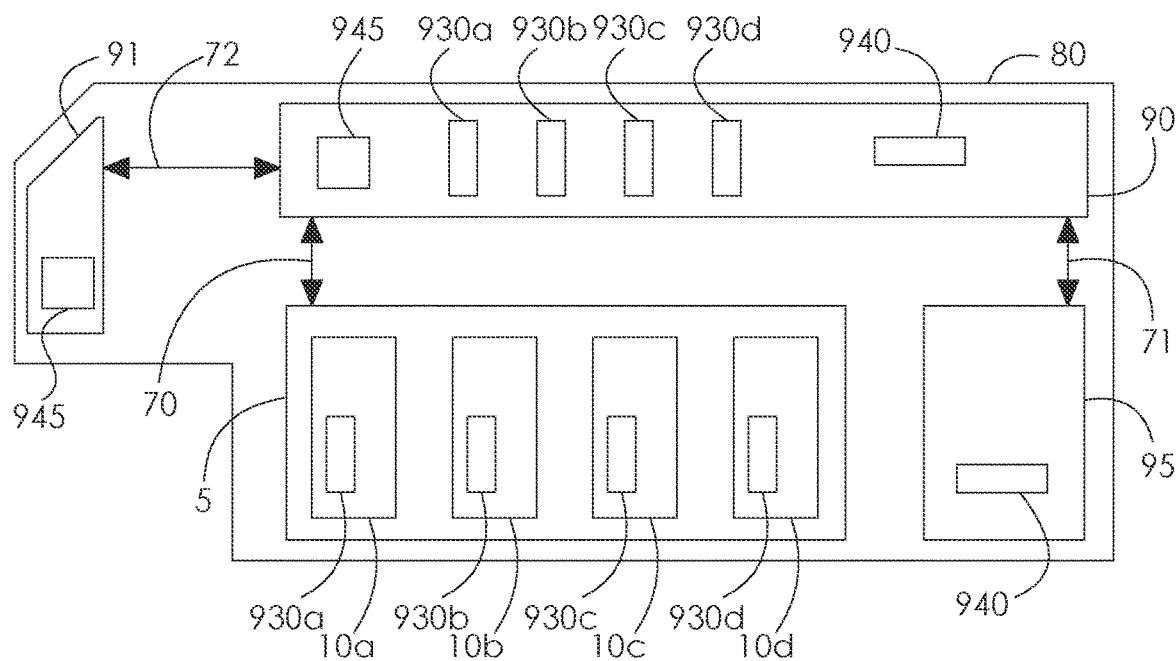
FIG. 8 diagrammatically illustrates Data Maps associated with each of the components of an electric vehicle power system of the present invention.

FIG. 8 diagrammatically illustrates the Data Maps associated with each of the components and sub-components of an embodiment of the power system 80 of the present invention for a vehicle 2. The SCU 90 is illustrated being in communication with vehicle Operator 91 via communications bus 71. A Power System Data Map (PSDM) 945 is shown being comprised within the SCU 90. A copy of the PSDM 945 is illustrated being in possession of the vehicle Operator 91.

A battery pack 5 is shown being in communication with the SCU 90 via communications bus 70. The battery pack 5 is further shown having a plurality of removable modules 10, illustrated as 10a, 10b, 10c and 10d. The number of modules shown is illustrative and is not numerically limiting. Each of the removable modules 10 is shown having an associated Module Capacity Data Map (MCDM) 930, illustrated respectively as 930a, 930b, 930c and 930d. A copy of each MCDM 930 is shown in possession of the SCU 90.

A PCU 95 is shown being in communication with the SCU 90 via communications bus 71, and is further shown having a Power Demand Data Map (PDDM) 940. A copy of the PDDM 940 is shown in possession of the SCU 90.

A Data Map associated with a component or sub-component of a power system 80 may be generated through design engineering analysis, pre-production testing, testing during manufacture, or be computed from measurement data in use. A previously generated data map may be updated with measurement data in use, as further disclosed hereinbelow.

In the following descriptions, it should be assumed that an authorization procedure such as the one shown in flow chart 501 (FIG. 5) has been successfully completed for the modules 10, and that the modules 10 are in an UNLOCKED programmed state (FIG. 4).

Figure 9:
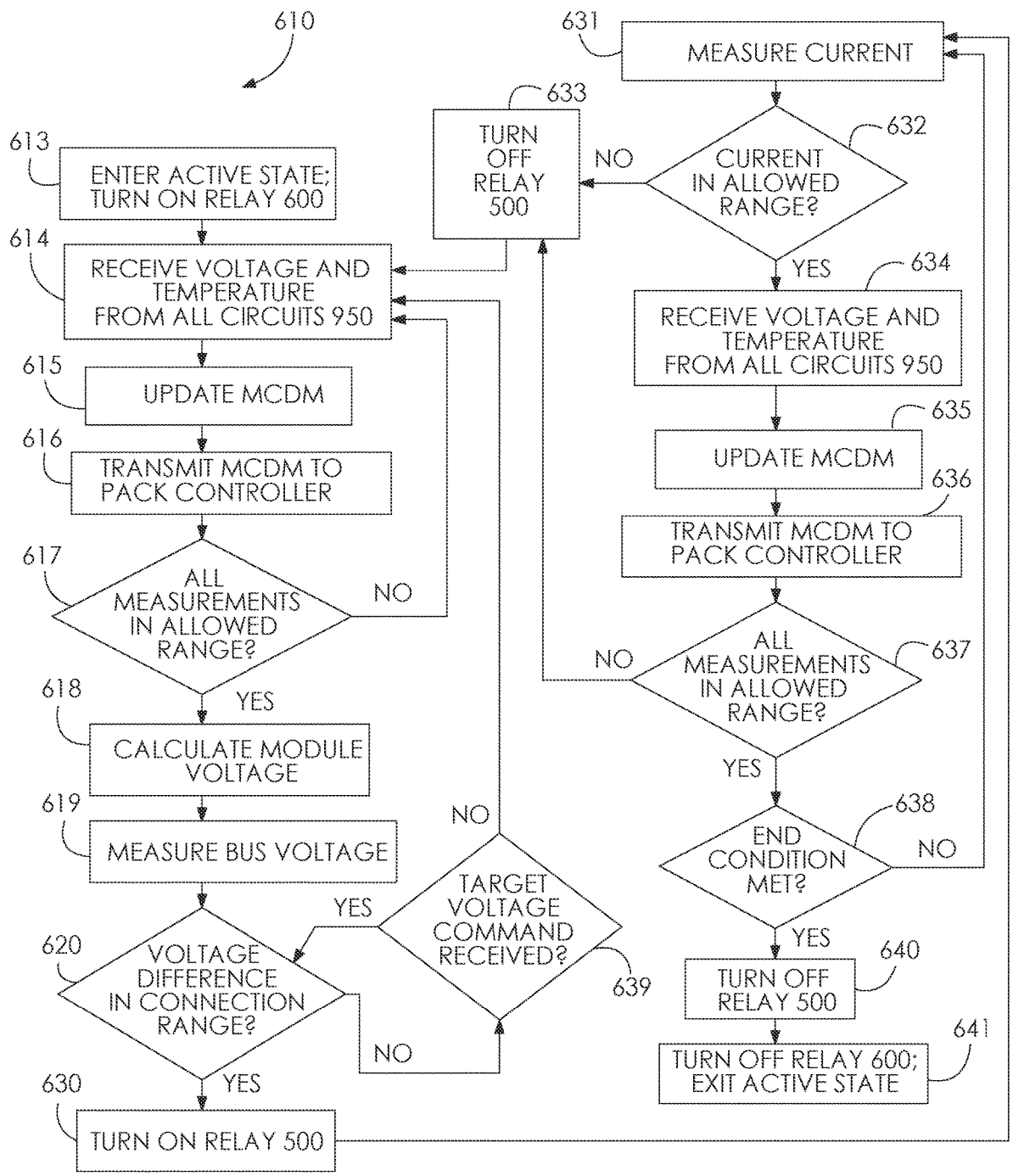
FIG. 9 shows a flowchart for a method of operating a removable battery module.

A flow chart 610 for a method of operating a module 10 that has been installed and authenticated in a pack 5 is illustrated in FIG. 9. It should be noted that in some alternative implementations, the functions noted in the blocks may occur out of the order noted in FIG. 9, may include additional functions, and/or may omit some functions. For example, two blocks shown in succession in FIG. 9 may in fact be executed substantially concurrently, the blocks may sometimes be executed in the reverse order, or some of the blocks may not be executed in all instances, depending upon the functionality involved, as will be further clarified hereinbelow. In particular, the evaluation at block 638 and the subsequent proceeding to block 640 may be carried out by means of an analog or other electronic circuit responsive to measurement of current by the current measurement circuit 905 (FIG. 3) and/or responsive to measurement of voltage by the voltage measurement circuit 907. Such evaluation may be carried out concurrently with any of the steps illustrated in FIG. 9. All such modifications and variations are intended to be included herein within the scope of this disclosure and to be protected by the accompanying claims.

At block 613, an active state is entered responsive to a valid command received from a pack controller 40, and may be a CHARGING or ENABLED active state. Relay 600 is turned on to connect the negative terminal 300 of the module 10 to the negative power bus 30. In some embodiments, relay 600 may be of electromechanical type. In other embodiments, relay 600 may be omitted, having a permanent connection between the series-connected cells 400 and the negative terminal. In yet other embodiments, the relay 500 may be connected to the negative terminal, and the relay 600 be connected to the positive terminal or be omitted. All such modifications and variations are intended to be included herein within the scope of this disclosure.

In the illustrated embodiment, module controller 900 is configured to obtain voltage and temperature measurements for each cell 400 from circuits 950 via communications link 999 (FIG. 3) to determine a recent voltage value and a recent temperature value for each of the cells 400. At block 614, the individual voltage and temperature measurements for each cell 400 of the module 10 are received from the corresponding circuits 950. Due to the fact that relay 500 is turned off during these measurements, the voltage measurements obtained at block 614 are referred to herein as open-circuit voltage measurements, and the temperature measurements obtained at block 614 are referred to herein as open-circuit temperature measurements. Each time the measurements at block 614 are obtained, the values obtained are taken as the recent open-circuit voltage values and the recent open-circuit temperature values for each of the cells 400, collectively referred to herein as "recent open-circuit values".

The MCDM 930 corresponding to the module 10 is updated with the recent open-circuit voltage values and the recent temperature values responsive to the received measurements by the module controller 900 at block 615. The Measured Module Voltage (MMV) may be calculated by adding the recent voltage values for each cell 400 and is included in the MCDM 930. Additional examples of updates to the MCDM 930 may include high and low observed peak values, averages and trends.

The updated MCDM 930 is transmitted to the pack controller 40 by the module controller 900 at block 616.

Each of the recent open-circuit values are compared at block 617 to one or more predetermined limit values that may be stored in the MCDM 930 to verify that none have fallen outside a predetermined allowed range. If any of the recent open-circuit values is found to be outside of allowed range, the steps beginning at block 614 are repeated to obtain new recent open-circuit values.

If all recent open-circuit values are within the predetermined allowed range, at block 618 the overall Measured Module Voltage (MMV) is calculated by adding the recent open-circuit voltages of each cell 400 and is taken as the recent MMV value.

In the illustrated embodiment, module controller 900 is configured to obtain voltage measurement between positive terminal 200 and negative terminal 300 by means of the voltage measurement circuit 907 (FIG. 3). At block 619 the Measured Bus Voltage (MBV) is measured by means of voltage measuring circuit 907 between the terminals. The value obtained by the measurement at block 619 is taken as the recent MBV value.

At block 620, a voltage comparison is made between the recent MMV value and the recent MBV value. If the difference between the recent MMV and MBV values is within an allowed range, which may be a predetermined value that is recorded in the MCDM 930, the method proceeds to block 630. Otherwise, the steps beginning with block 614 are repeated to obtain new recent open-circuit values. The purpose of the comparison is to ensure that upon turning on of the relay 500 in block 630 no excessive current will result.

Figure 10:
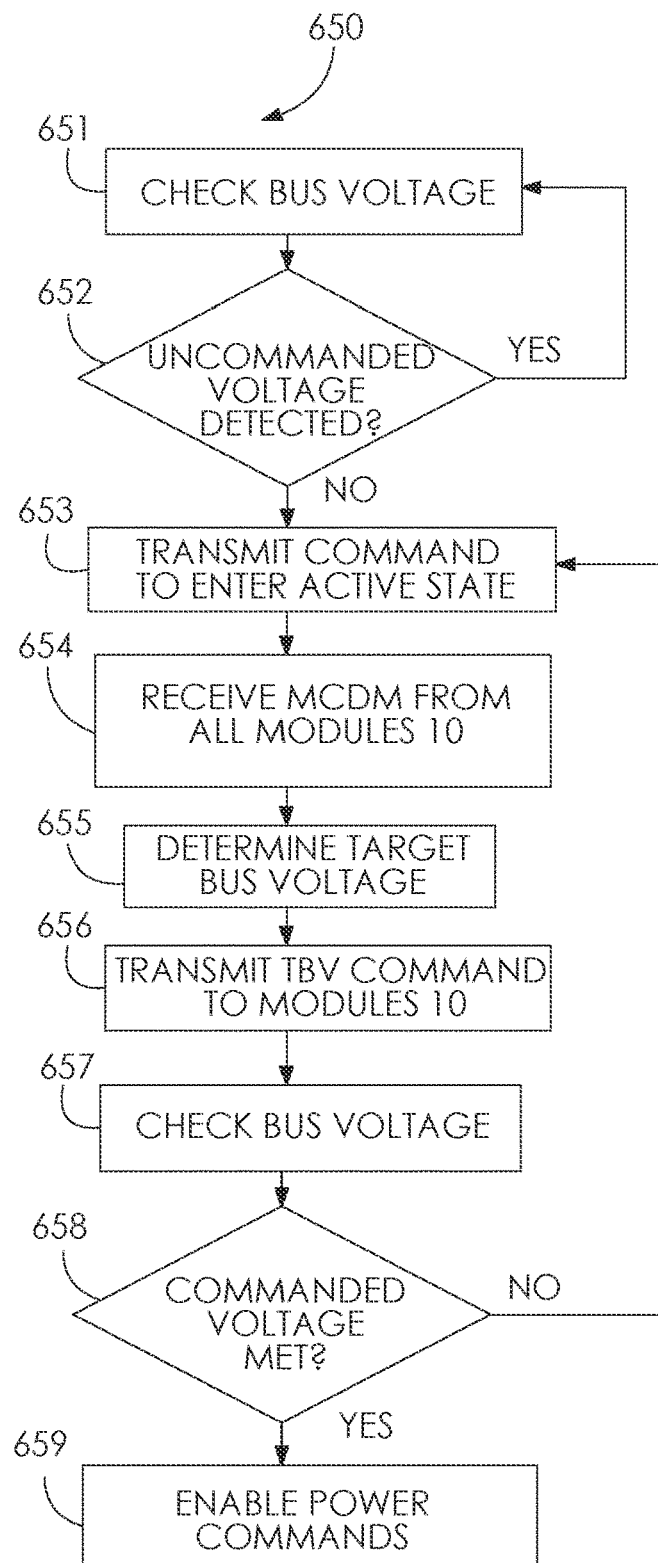
FIG. 10 is a flow chart for a method of energizing a power bus of an electric vehicle power system utilizing a plurality of battery modules.

Alternatively, if a Target Bus Voltage (TBV) value has been received via a valid command from pack controller 40, as determined at block 639, then the comparison at block 620 is made between MMV and TBV. The purpose of this alternative comparison is to facilitate the initial energizing of the power bus as further detailed hereinbelow (FIG. 10).

In some embodiments wherein the module 10 comprises additional relays to configure the module to an alternative voltage, as disclosed in the referenced co-pending application Ser. No. 17/182,072, the module 10 may be configured responsive to a received TBV value and prior to the comparison at block 620.

If the result of the voltage comparison is affirmative, the relay 500 is turned on at block 630. As used herein, a comparison is deemed to be affirmative if the values being compared are found to be equal or fall within a predetermined range of each other; otherwise the comparison is deemed to be negative. The relay 500 may be of Silicon Carbide semiconductor type in some embodiments.

In the illustrated embodiment, module controller 900 is configured to obtain current measurement between positive terminal 200 and negative terminal 300 through the plurality of series-connected cells 400 by means of the current measurement circuit 905 (FIG. 3). Once relay 500 is turned on at block 630, the magnitude and direction of Module Measured Current (MMC) is measured by means of the current measurement circuit 905. In some embodiments the current measurement circuit 905 may be of Hall Effect type.

At block 632, a comparison is made between MMC measured at block 631 and predetermined range of values recorded in the MCDM 930. If MMC is found to be allowed range, the method proceeds to block 634. Otherwise, at block 633 the relay 500 is turned off, and the steps beginning at block 614 are repeated.

In some embodiments, the functionality of block 632 may be implemented by an analog or other electronic circuit that opens relay 500 responsive to a predetermined magnitude of current as measured by the measurement circuit 905 (FIG. 3). In other embodiments, an analog or other electronic circuit to turn off the relay 500 responsive to current measured by the measurement circuit 905 may operate in parallel with the execution of the steps illustrated in flowchart 610 by the module controller 900. All such modifications and variations are intended to be included herein within the scope of this disclosure and to be protected by the accompanying claims.

At block 634, individual voltage and temperature measurements for each cell 400 of the module 10 are received from the corresponding circuits 950. The voltage measurements obtained at block 634 are referred to herein as closed-circuit voltage measurements, and the temperature measurements obtained at block 634 are referred to herein as closed-circuit temperature measurements. Each time the measurements at block 634 are obtained, the values obtained are taken as the recent closed-circuit voltage values and the recent closed-circuit temperature values for each of the cells 400, collectively referred to herein as "recent closed-circuit values".

The MCDM 930 is then updated at block 635 using the recent closed-circuit voltage values and the recent temperature values, responsive to the measurements received at block 634 and to the MMC measured at block 631.

The updated MCDM 930 is transmitted to the pack controller 40 by the module controller 900 at block 636.

The recent closed-circuit values are compared at block 637 to predetermined limit values, which may be stored in the MCDM 930, to verify that none have fallen outside predetermined allowed range. If any of the recent closed-circuit values is found to be outside of allowed range, at block 633 the relay 500 is turned off, and the steps beginning at block 614 are repeated. Examples of predetermined allowed range may include specific minimum and/or maximum values for voltage, temperature and/or current. Other examples may include a specific percentage change of a value within a specific period of time, such as a percentage increase in temperature that may be indicative of an undesirable operating condition. The exact values that specify a predetermined allowed range are dependent on the details of battery cell construction, battery module construction, and/or thermal management apparatus of the power system.

At block 638 a check is performed if an end condition has been met. Examples of end condition may include a disable command from the pack controller 40, the failure to receive a command from the pack controller 40 within a specified period of time, and the like. If an end condition is detected, the relay 500 is turned off at block 640. The relay 600 is then turned off and the active state is exited at block 641. By turning off the relay 500, which may be of Silicon Carbide semiconductor type, prior to turning off the relay 600, which may be of electromechanical type, potential for arcing and the associated failure modes in the relay 600 is eliminated.

A flow chart 650 for a method of energizing the power bus of a power system 80 having a plurality of modules 10 installed and authenticated in a pack 5 is illustrated in FIG. 10. It should be noted that in some alternative implementations, the functions noted in the blocks may occur out of the order noted in FIG. 10, may include additional functions, and/or may omit some functions. For example, two blocks shown in succession in FIG. 10 may in fact be executed substantially concurrently, the blocks may sometimes be executed in the reverse order, or some of the blocks may not be executed in all instances, depending upon the functionality involved, as will be further clarified hereinbelow. All such modifications and variations are intended to be included herein within the scope of this disclosure and to be protected by the accompanying claims.

In the following descriptions, the functionality of pack controller 40 is deemed to be a component of the SCU 90 (FIG. 7). References to SCU 90 transmitting commands to, and receiving data from, modules 10 should be understood to be utilizing the functionality of pack controller 40.

Prior to energizing the power bus, the bus voltage measurement MBV is obtained by the SCU 90, either directly or by communicating with another component such as PCU 95, or a module 10, in order to ensure that no uncommanded voltage is present on the bus.

If uncommanded voltage is detected on the power bus at block 652, the steps beginning at block 651 are repeated. This may allow time for any residual voltage to dissipate. Additional steps such as attempting to discharge the residual voltage by the PCU 95 may be taken in some embodiments. Examples of discharging residual voltage by the PCU 95 may include conduction of electrical current through one or more electrical motor windings, conversion of electrical energy into thermal or mechanical energy, storage of electrical energy in an accumulator such as a capacitor or a battery, and the like.

The steps of blocks 651 and 652 are a safety measure to verify the power system's ability to de-energize the power bus. These safety measures 651 and 652 may be omitted in some embodiments.

At block 653 a command to enter an active state is transmitted by the SCU 90 to all modules 10 via communications bus 70 (FIG. 7). The command may be transmitted to each module 10 individually, or broadcast to all modules 10 substantially simultaneously. The commanded active state may be CHARGING or ENABLED (FIG. 4).

Responsive to entering the commanded active state, each module 10 transmits its MCDM 930 to the SCU 90 (FIG. 9). All received MCDMs 930 are stored by the SCU 90 (FIG. 8) at block 654. Each MCDM 930 includes the MMV disclosed in the description of step 615 hereinabove.

At block 655 the Target Bus Voltage (TBV) is calculated, and may, in some embodiments, be the highest MMV among the installed modules 10.

The Target Voltage Command (TVC) is then transmitted to all modules 10 via communications bus 70. The TVC command may be transmitted to each module 10 individually or broadcast substantially simultaneously to all installed modules 10. Responsive to receiving the Target Voltage Command (block 639 of FIG. 9), each module 10 will perform the voltage comparison (block 620 of FIG. 9) and if the comparison is affirmative, turn on its corresponding relay 500 (block 630 of FIG. 9). It should be understood that the result of the voltage comparison may not be affirmative for one, several, or all modules 10.

The MBV is again checked at block 657. If at least one among modules 10 has turned on its relay 500, and there are no unanticipated electrical loads on the power bus, the MBV will closely match the MMV of that module. If more than one module 10 has turned on its relay 500, and there is a variation between MMVs of any two modules 10, an equalizing current may flow between the modules and the resultant MBV may be between the MMVs of the modules 10.

If the equalizing current resulting from differences between MMV of any two modules is outside a predetermined range, one or more of the modules may subsequently turn off its relay 500 responsive to determination made at block 632 of FIG. 9.

At block 658, a comparison is made between TBV and MMV. In some embodiments the comparison may be made with reference to predetermined threshold values that may be stored in the PSDM 945 (FIG. 8). If the comparison is affirmative, the issuance of power commands from the SCU 90 to the PCU 95 is enabled at block 659. As used herein, a comparison is deemed to be affirmative if the values being compared are found to be equal or fall within a predetermined range of each other. Otherwise, the comparison is deemed to be negative and the steps beginning at block 653 are repeated.

Figure 11:
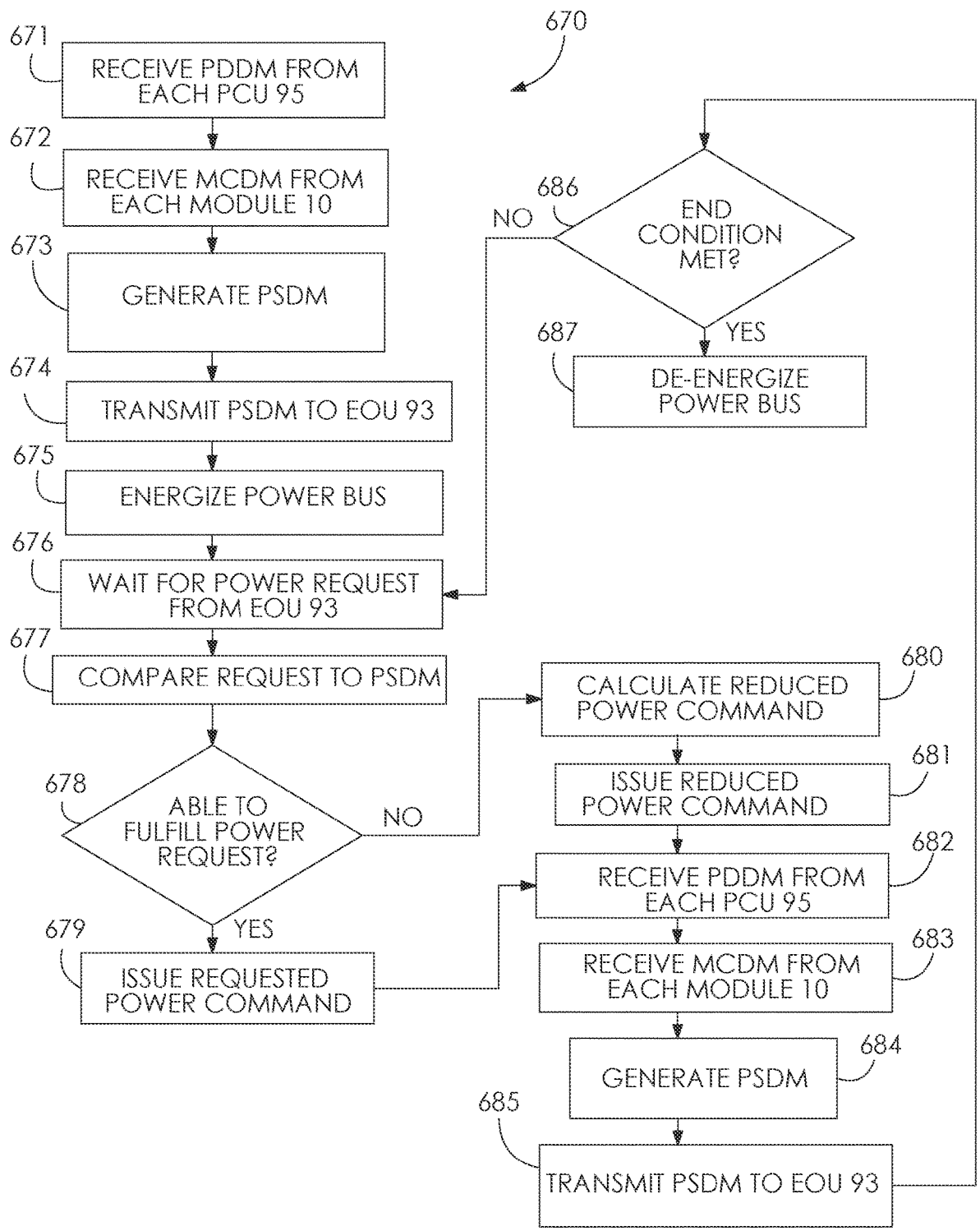
FIG. 11 is a flow chart for a method of controlling a power system of an electric vehicle.

A flow chart 670 for a method of operating a power system 80 having a plurality of modules 10 installed in a pack 5 (FIG. 7) is illustrated in FIG. 11. It should be noted that in some alternative implementations, the functions noted in the blocks may occur out of the order noted in FIG. 11, may include additional functions, and/or may omit some functions. For example, two blocks shown in succession in FIG. 11 may in fact be executed substantially concurrently, the blocks may sometimes be executed in the reverse order, or some of the blocks may not be executed in all instances, depending upon the functionality involved, as will be further clarified hereinbelow. It should be further noted that in particular the evaluation at block 686 and the subsequent proceeding to block 687 may be carried out concurrently with any of the other steps illustrated in FIG. 11. All such modifications and variations are intended to be included herein within the scope of this disclosure.

At block 671, an up-to-date copy of PDDM 940 is received by the SCU 90 from the PCU 95. At block 672, up-to-date copies of individual MCDM 930s are received by the SCU 90 from all individual modules 10 via the functionality of pack controller 40. In the subsequent references to communications between the SCU 90 and one or more modules 10, it should be understood that the functionality of pack controller 40, which may be comprised within the SCU 90 or may be a separate physical controller, is utilized to carry out the communication.

At block 673 an up-to-date PSDM 945 is generated by the SCU 90 with reference to the PDDM 940 received at block 671 and the MCDM 930s received at block 672. The exact techniques of generating the PSDM 945 and the exact nature of data it contains may vary according to the specifics of each embodiment. In many embodiments, the PDDM 940 contains data pertaining to the power bus voltage and current that is necessary to fulfill a specific value of power command issued to the PCU 95 at a specific operating condition of the system component 96. Each MCDM 930 received from the modules 10 contains data pertaining to the magnitude of current which the corresponding module is able to deliver or absorb at a given power bus voltage. At some values of the power bus voltage, which may be different for each individual module 10, such magnitude of current may be zero.

In many embodiments, the SCU 90 combines the current capability of all modules at predetermined power bus value voltages. This combined current capability data is recorded in the PSDM 945. The data from the PDDM 940 correlating power commands to the required power bus voltage and current is further recorded in the PSDM 945. Additional equations, executable software subroutines, correction factors and other data may be further recorded in the PSDM 945. Historical data referencing past observed performance of the power system may further be recorded in the PSDM 945.

The resulting generated PSDM 945 may, in some embodiments, be transmitted to the EOU 93. In such embodiments the PSDM 945 may be further utilized by the Operator 91 to predict or estimate vehicle performance and correspondingly adjust route planning and/or other operational parameters. A visual display with a graphical and/or numerical representation of the data contained in the PSDM 945 may be optionally presented to a human operator 92 via a human interface 94.

At block 675 the power bus is energized by the method illustrated in flowchart 650 (FIG. 10). It should be noted that in the context of the disclosures made herein, each of the modules 10 should be understood to be controlled by the corresponding module controller 900 in accordance with the method illustrated in flowchart 610 (FIG. 9). Consequently, the modules that complete the comparison at block 620 in the affirmative, will turn on their corresponding relays 500 and be connected to the power bus. Modules that complete the comparison of block 620 in the negative will continue repeating steps at blocks 614-620 until the power bus voltage changes sufficiently to enable an affirmative outcome at block 620. Such power bus voltage change may take place responsive to a power command being issued by the SCU 90 to the PCU 95, as further detailed hereinbelow. The power bus voltage necessary for any specific module 10 to turn on its relay 500 may be predicted by the SCU 90 with reference to the corresponding MCDM 930 and/or with reference to the PDSM.

At block 676 in FIG. 11 the SCU 90 waits for a power request from the EOU 93. In many embodiments, periodic power requests may be issued from the EOU 93 to the SCU 90 and may be issues several times per second. In some such embodiments, the failure by the SCU 90 to receive a valid power request from the EOU 93 within a specified period of time may constitute meeting an end condition (block 686), causing the SCU to de-energize the power bus at block 687 as further detailed hereinbelow. A valid power request may be of any magnitude and may be positive, negative or zero.

Upon receipt of a valid power request, the SCU 90 references the data recorded in the PSDM 945 and/or the up-to-date PDDM 940 to obtain the necessary values of bus voltage and current necessary to fulfill the request at the current operating conditions. The PSDM 945 is then further referenced at block 678 to evaluate whether the combined current capability of all modules 10 that are able to connect to the power bus at the desired voltage is sufficient to deliver the desired current at that voltage.

In embodiments where one or more additional system components 96 are present, being controlled by respective one or more additional PCUs 95, an evaluation of contributive power level for each such additional component 96 may be carried out in step 678 with reference to respective one or more additional PDDMs 940. An illustrative diagram of such an embodiment is shown in FIG. 12 with the additional system components being illustrated as 96b and 96c. The contributive power of the additional system components maybe additive or subtractive to the power level of the first system component 96. For example, an additional system component 96c that is a generator may have a contributive power level that is subtractive to the power level of the first system component 96 that is a traction motor. Another additional system component 96a that is a traction motor (not illustrated) would have a contributive power level that is additive to the power level of the first system component 96 that is a traction motor. In such embodiments, an updated PSDM may be generated responsive to the determination of the contributive power level of one or more additional system components. The updated PSDM is then taken as the PSDM for evaluating the power level of the first system component 96 at step 678.

If the evaluation at block 678 is affirmative, the power command that is substantially equal to the power request is issued by the SCU 90 to the PCU 95. Responsive to the power command, the PCU 95 then controls the system component 96, resulting in electrical power being drawn from or delivered to the power bus. The power bus voltage and/or current may change as a result of the electrical power being delivered to or drawn from the power bus. One or more of the modules 10 may subsequently turn on or turn off its corresponding relay 500 responsive to said change of power bus voltage and/or current, in accordance with the method illustrated in the flowchart 610 (FIG. 9).

In embodiments having additional system components, the respective contributive power level command is issued to each respective PCU coupled to the additional system components in step 678.

If the evaluation at block 678 is negative, the SCU 90 references the data in the PSDM 945 at block 680 to calculate a reduced power command which would not result in exceeding the combined current capability of the modules 10 at the desired voltage.

The reduced power command is issued by the SCU 90 to the PCU 945 at block 681.

Responsive to the reduced power command, the PCU 95 then controls the system component 96, resulting in electrical power being drawn from or delivered to the power bus. The power bus voltage may change as a result. One or more of the modules 10 may subsequently turn on or turn off its corresponding relay 500 responsive to said change of power bus voltage, in accordance with the method illustrated in the flowchart 610 (FIG. 9).

An up-to-date PDDM 940 is received by the SCU 90 from the PCU 95 incorporating any changes that may have resulted from fulfilling the most recently issued power command.

At block 683, up-to-date MCDM 930 is received from each module 10 incorporating any changes that may have resulted from fulfilling the most recently issued power command.

An up-to-date PSDM 945 is generated by the SCU 90 at block 684 referencing the data received at blocks 682 and 683.

In some embodiments, a copy of the PSDM 945 generated at block 684 is transmitted to the EOU 93 at block 685.

An evaluation of end condition is made at block 686, and may also be made concurrently with any other block illustrated in flowchart 670. An end condition may be the receipt of a stop command from the EOU 93, the detection of a fault condition, a failure to receive a valid power request from the EOU 93 within a predetermined period of time, and the like. If the evaluation of end condition at block 686 is negative, the steps beginning at block 676 are repeated.

If the evaluation of end condition is positive, at block 687 the power bus is de-energized by the SCU 90. In some embodiments, a disconnect command, which may have a Target Bus Voltage (TBV) of zero, may be transmitted by the SCU 90 to all modules 10 causing a positive evaluation of end condition at block 638 by each module 10. In some embodiments, the PCU 95 may have substantial capacitors which may continue to supply electrical energy to the power bus after all modules 10 have turned off their respective relays 500. In such embodiments, the PCU may have the ability to discharge the electrical energy stored in the capacitors through the system component 96. A command to discharge the capacitors may be issued by the SCU 90 to the PCU 95 to discharge the capacitors in such embodiments. In other embodiments, the capacitors may be discharged through a resistor or similar electrical load by connecting it to the power bus through a relay. In yet other embodiments, a voltage converter circuit may be activated to transfer the energy from the capacitors to a low-voltage battery.

It should be emphasized that the above-described embodiments of the battery module 10 and vehicle power system 80 are merely possible examples of implementations of the invention. Many variations and modifications may be made to the above-described embodiments. All such modifications and variations are intended to be included herein within the scope of this disclosure and protected by the following claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

Therefore, having thus described the invention, at least the following is claimed:

1. A stationary installation having a power system, said power system comprising:

an electronic operator unit;

a first power controller unit coupled to a first system component, said first power controller unit having a predetermined first power demand, said first power demand associated with at least a current numerical value and a voltage numerical value required in order to deliver a predetermined power level at the first system component, said current numerical value and said voltage numerical value being recorded in a first power demand data map, a system control unit communicatively coupled to a communications bus, to the electronic operator unit, and the first power controller unit;

a battery pack having a plurality of sockets each for receiving one of a plurality of battery modules, and configured to couple the plurality of battery modules received in the plurality of sockets to a power bus, and configured to communicatively couple the plurality of battery modules received in the plurality of sockets to the communications bus;

the power bus further comprising a negative power bus and a positive power bus, said power bus being coupled to each of the plurality of sockets of the battery pack, and said power bus further being coupled to the first power controller unit;

wherein a power system data map is being generated by the system control unit responsive to data recorded in the first power system data map.

2. The stationary installation of claim 1, said power system further comprising:

a first battery module being received in a first of the plurality of sockets of the battery pack, said first battery module comprising:

a first plurality of series-connected cells;

a first positive terminal;

a first negative terminal;

a first module controller configured to obtain a first measurement of a voltage between the first positive terminal and the first negative terminal, a second measurement of a temperature for each of the first plurality of series-connected cells, and a third measurement of an electrical current flowing between the first positive terminal and the first negative terminal; and a first relay being controllably coupled to the first module controller, wherein said first relay is configured to connect a first of the plurality of series-connected cells to one of the first positive terminal and the first negative terminal, wherein said first module controller is configured to communicate with the system control unit via the communications bus, wherein said first battery module has an associated first module capacity, said first module capacity being numerically represented by data stored in a first module capacity data map within the first module controller;

wherein the power system data map is further being generated by the system control unit responsive to data recorded in the first module capacity data map.

3. The stationary installation of claim 2, said power system further comprising:
- a second battery module being received in a second of the plurality of sockets of the battery pack, said second battery module comprising:
  - a second plurality of series-connected cells,
  - a second positive terminal,
  - a second negative terminal,
  - a second module controller configured to obtain a second measurement of a voltage between the second positive terminal and the second negative terminal, a second measurement of a temperature for each of the second plurality of series-connected cells, and a third measurement of an electrical current flowing between the second positive terminal and the second negative terminal; and
  - a second relay being controllably coupled to the second module controller, wherein said second relay is configured to connect a first of the second plurality of series-connected cells to one of the second positive terminal and the second negative terminal,
- wherein said second module controller is configured to communicate with the system control unit via the communications bus,
- wherein said second battery module has an associated second module capacity, said second module capacity being numerically represented by data stored in a second module capacity data map within the second module controller;
- wherein the power system data map is further being generated by the system control unit responsive to data recorded in the second module capacity data map.

4. The stationary installation of claim 1, said power system further comprising:
- a second power controller unit being coupled to a second system component, said second power controller unit having a second predetermined power demand, said second power demand having associated numerical values of current and voltage required in order to deliver a predetermined power level at the second system component, said associated numerical values of current and voltage being recorded in a second power demand data map, the system control unit further being communicatively coupled to the second power controller unit, the power bus further being coupled to the second power controller unit;
- wherein the power system data map is further being generated by the system control unit responsive to data recorded in the second power system data map.

5. The stationary installation of claim 4 wherein said second system component is an external power source.

6. The stationary installation of claim 4 wherein said second system component is a generator.

7. The stationary installation of claim 4 wherein said second system component is an external power grid connection.

8. The stationary installation of claim 1, wherein said first system component is a heating, ventilation, and air-conditioning unit.

9. The stationary installation of claim 1 wherein said stationary installation is a vehicle charging station.

10. The stationary installation of claim 1 wherein said stationary installation is a renewable energy storage facility.

* * * * *